United States Patent
Cao

(10) Patent No.: US 12,199,677 B2
(45) Date of Patent: Jan. 14, 2025

(54) OPTICAL SIGNAL PROCESSING METHOD AND APPARATUS

(71) Applicant: HUAWEI TECHNOLOGIES CO., LTD., Shenzhen (CN)

(72) Inventor: Shiyi Cao, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 890 days.

(21) Appl. No.: 17/239,872

(22) Filed: Apr. 26, 2021

(65) Prior Publication Data
US 2021/0242943 A1 Aug. 5, 2021

Related U.S. Application Data

(63) Continuation of application No. PCT/CN2019/113584, filed on Oct. 28, 2019.

(30) Foreign Application Priority Data

Oct. 29, 2018 (CN) .......................... 201811271254.1

(51) Int. Cl.
H04B 10/297 (2013.01)
H01S 3/067 (2006.01)
(Continued)

(52) U.S. Cl.
CPC ..... *H04B 10/2972* (2013.01); *H04B 10/2537* (2013.01); *H04B 10/40* (2013.01); *H01S 3/06787* (2013.01); *H04B 10/071* (2013.01)

(58) Field of Classification Search
None
See application file for complete search history.

(56) References Cited

U.S. PATENT DOCUMENTS

| 4,879,763 A | 11/1989 | Wood |
| 5,598,289 A * | 1/1997 | Watanabe ......... H04B 10/2587 398/175 |

(Continued)

FOREIGN PATENT DOCUMENTS

| CN | 1913398 A | 2/2007 |
| CN | 103152099 A | 6/2013 |
| CN | 107801235 A | 3/2018 |

OTHER PUBLICATIONS

Xiong et al., "Application of Single-Wavelength Bidirectional Transmission in Optical Fiber Communication Network of Power System", Inner Mongolia Electric Power, 2017, vol. 35, No. 4, 5 pages.
Ko et al., "Estimation of Performance Degradation of Bidirectional WDM Transmission Systems Due to Rayleigh Backscattering and ASE Noises Using Numerical and Analytical Models", Journal of Lightwave Technology, vol. 21, No. 4, Apr. 2003, 9 pages.
(Continued)

*Primary Examiner* — Eric L Bolda
(74) *Attorney, Agent, or Firm* — Maier & Maier, PLLC

(57) ABSTRACT

An optical signal processing method and apparatus. The method includes: obtaining a first sending signal, where the first sending signal is a signal that is sent by a first transmitter to a second receiver through a first optical fiber; determining estimation information of a backward optical signal based on the first sending signal; the backward optical signal is generated during transmission of the first sending signal, the backward optical signal is transmitted through at least one fiber section in the first optical fiber, and a transmission direction of the backward optical signal is opposite to a transmission direction of the first sending signal; and obtaining a second sending signal based on the estimation information of the backward optical signal. According to the embodiments, impact of the backward optical signal on effective signal transmission can be reduced, and a signal-to-noise ratio can be improved.

19 Claims, 8 Drawing Sheets

(51) Int. Cl.
    *H04B 10/2537*     (2013.01)
    *H04B 10/40*     (2013.01)
    *H04B 10/071*     (2013.01)

(56) References Cited

U.S. PATENT DOCUMENTS

| | | | |
|---|---|---|---|
| 9,036,991 B2 * | 5/2015 | Aguren | H04B 10/071 |
| | | | 398/21 |
| 2002/0171914 A1 | 11/2002 | Meli et al. | |
| 2007/0041006 A1 | 2/2007 | Abbott | |
| 2013/0330072 A1 * | 12/2013 | Xia | H04B 10/2537 |
| | | | 398/26 |
| 2014/0072306 A1 | 3/2014 | Sridhar et al. | |
| 2015/0304036 A1 | 10/2015 | Huang et al. | |
| 2018/0069595 A1 | 3/2018 | Dai et al. | |
| 2020/0195341 A1 * | 6/2020 | Ait Sab | H04B 10/27 |

OTHER PUBLICATIONS

Staubli et al., "Power Penalties Due to Multiple Rayleigh Backscattering in Coherent Transmission Systems Using In-Line Optical Amplifiers", IEEE Photonics Technology Letters, vol. 2, No. 12, Dec. 1990, 3 pages.

Van Deventer, "Polarization Properties of Rayleigh Backscattering in Single-Mode Fibers", Journal of Lightwave Technology, vol. 11, No. 12, Dec. 1993, 5 pages.

Gysel et al., "Statistical Properties of Rayleigh Backscattering in Single Mode Fibers", Journal of Lightwave Technology, vol. 8, No. 4, Apr. 1990, 7 pages.

Jang et al., "Suppression of Rayleigh backscattering in a bidirectional WDM optical link using clipped direct modulation"; 004-08-04; IEE Proc.-Optoelectron; vol. 151, No. 4; 4pages.

* cited by examiner

OPTICAL SIGNAL PROCESSING METHOD AND APPARATUS

CROSS-REFERENCE TO RELATED APPLICATIONS

This application is a continuation of International Application No. PCT/CN2019/113584, filed on Oct. 28, 2019, which claims priority to Chinese Patent Application No. 201811271254.1, filed on Oct. 29, 2018. The disclosures of the aforementioned applications are hereby incorporated by reference in their entireties.

TECHNICAL FIELD

Embodiments relate to optical communications technologies, and in particular, to an optical signal processing method and apparatus.

BACKGROUND

A single-fiber bidirectional optical transmission system refers to a system in which an optical fiber is used to transmit both sent and received optical signals. Compared with a single-fiber unidirectional system, the single-fiber bidirectional optical transmission system can reduce a quantity of optical fibers by half, and double spectral efficiency (SE).

In the single-fiber bidirectional optical transmission system, Rayleigh backscattering usually exists, which affects a receiver to receive a signal sent from a peer end. Rayleigh scattering is caused by a random fluctuation of fiber density during manufacturing, which leads to a local fluctuation of a refractive index. As a result, light is scattered in all directions. Therefore, Rayleigh scattering has certain randomness. The Rayleigh backscattering is usually considered as noise, which limits a transmission distance of the single-fiber bidirectional optical transmission system and even makes the system unavailable in some scenarios. For example, in an optical transmission system of 200 Gbit/s at 50 GHz (in other words, a spectrum width not greater than 50 GHz is used to transmit data of 200 Gbps, and Gbps is $10^9$ bit/s), it is assumed that a transmission distance span is 100 km (or an optical signal attenuation value brought by the span is 22 dB). If Rayleigh backscattering is used as noise (generally, power of a Rayleigh backscattering signal is 31 dB lower than power of a transmitted signal), a signal-to-noise ratio (SNR) decreases to 9 dB, which is lower than the requirement of 11.7 dB specified in Shannon theorem. Therefore, single-fiber bidirectional transmission of 200 Gbit/s at 50 GHz cannot be implemented.

Because the foregoing Rayleigh backscattering exists in the single-fiber bidirectional optical transmission system, the single-fiber bidirectional transmission system cannot support high-speed and long-distance optical transmission, and its application value is not high.

SUMMARY

Embodiments provide an optical signal processing method and apparatus to reduce impact of a backward optical signal on effective signal transmission and improve a signal-to-noise ratio. Therefore, single-fiber bidirectional transmission can be applied to long-distance transmission.

According to a first aspect, an embodiment provides an optical signal processing method, including: obtaining a first sending signal, where the first sending signal is a signal that is sent by a first transmitter to a second receiver through a first optical fiber; determining estimation information of a backward optical signal based on the first sending signal, where the backward optical signal is generated during transmission of the first sending signal, the backward optical signal is transmitted through at least one fiber section in the first optical fiber, and a transmission direction of the backward optical signal in the at least one fiber section is opposite to a transmission direction of the first sending signal; and obtaining a second sending signal based on the estimation information of the backward optical signal, where the second sending signal is a signal sent by a second transmitter to a first receiver through a second optical fiber, and at least a part of the first optical fiber and a part of the second optical fiber overlap; and in the overlapping part of optical fibers, the transmission direction of the first sending signal is opposite to a transmission direction of the second sending signal.

The estimation information of the backward optical signal is determined based on the first sending signal, and impact of the backward optical signal is removed from a signal received by the first receiver, so that the second sending signal sent by the second transmitter is restored. This can reduce the impact of the backward optical signal on effective signal transmission, and improve a signal-to-noise ratio. Therefore, single-fiber bidirectional transmission can be applied to long-distance transmission.

In a possible implementation, the obtaining a second sending signal based on the estimation information of the backward optical signal includes: obtaining a coherent received signal, where the coherent received signal is obtained by the first receiver in a coherent receiving manner; and obtaining the second sending signal based on the coherent received signal and the estimation information of the backward optical signal.

In a possible implementation, the backward optical signal is a Rayleigh backscattering signal.

In a possible implementation, the first sending signal includes first sending signals at multiple preset times before a current moment, and the determining estimation information of a backward optical signal based on the first sending signal includes: separately multiplying the first sending signals at the multiple preset times by a corresponding first coefficient, to obtain multiple first intermediate signals; determining the estimation information of the backward optical signal based on the multiple first intermediate signals; the first sending signal at each preset time corresponds to one first coefficient; and the first coefficient is related to any one or more of a strength attenuation coefficient, a propagation coefficient, a group velocity, and a Rayleigh backscattering coefficient when the optical signal is transmitted in the optical fiber.

In a possible implementation, the method further includes: determining second intermediate signals at the multiple preset times based on the first sending signals at the multiple preset times and the strength attenuation coefficient and the propagation coefficient when the optical signal is transmitted in the optical fiber; and the separately multiplying the first sending signals at the multiple preset times by a corresponding first coefficient, to obtain the multiple first intermediate signals includes: separately multiplying the second intermediate signals at the multiple preset times by the corresponding first coefficient, to obtain the multiple first intermediate signals.

The second intermediate signals at the multiple preset times are determined based on the first sending signals at the multiple preset times and the strength attenuation coefficient and the propagation coefficient when the optical signal is transmitted in the optical fiber, so that an amount of computation of the first coefficient can be reduced.

In a possible implementation, an effective length of the first optical fiber is L, the multiple preset times are N preset times, an interval between adjacent preset times is $\Delta T$, $\Delta T \cdot v = 2L/N$, where v the group velocity. The effective length of the first optical fiber is not greater than a length of the first optical fiber. The separately multiplying the first sending signals at the multiple preset times by a corresponding first coefficient, to obtain the multiple first intermediate signals includes: separately multiplying the first sending signals at the N preset times by the corresponding first coefficient, to obtain N first intermediate signals, where N is a positive integer.

In a possible implementation, at least one optical amplifier is disposed in the first optical fiber, the at least one optical amplifier divides the first optical fiber into at least two optical amplifier regenerator sections, and the multiple preset times include multiple preset times corresponding to each optical amplifier regenerator section. The separately multiplying the first sending signals at the multiple preset times by a corresponding first coefficient, to obtain the multiple first intermediate signals includes: separately multiplying first sending signals at the multiple preset times corresponding to each optical amplifier regenerator section by the corresponding first coefficient, to obtain the multiple first intermediate signals.

In a possible implementation, the method further includes: correcting or updating the first coefficient based on a bit error rate, before bit error correction is performed, used when the second sending signal is obtained.

The first coefficient used for calculating the estimation information of the backward optical signal is corrected or updated by using a pre-correction bit error rate. This improves calculation accuracy of the backward optical signal.

In a possible implementation, the method further includes: correcting or updating the first coefficient based on the estimation information of the backward optical signal in a preset time window and stopping sending the second sending signal by the second transmitter in the preset time window.

A detection time window of the backward optical signal is set, and in the detection time window of the backward optical signal, the second transmitter stops sending the second sending signal, so that the first receiver can calculate, based on the signal that is sent by the first transmitter, the first coefficient used when the estimation information of the backward optical signal is corrected or updated. This improves calculation accuracy of the backward optical signal.

According to a second aspect, an embodiment provides an optical signal processing apparatus. The optical signal processing apparatus serves as a first receiver and has a function of implementing steps in the first aspect. The function may be implemented by hardware, or may be implemented by hardware executing corresponding software. The hardware or the software includes one or more units corresponding to the foregoing functions.

According to a third aspect, an embodiment provides an optical signal processing apparatus, where the optical signal processing apparatus serves as a first receiver and includes a processor and a memory. The memory is configured to store a computer-executable instruction. When the first receiver runs, the processor executes the computer-executable instruction stored in the memory, the first receiver is enabled to perform the optical signal processing method according to any one of the first aspect.

According to a fourth aspect, an embodiment provides a computer-readable storage medium, configured to store a computer software instruction used by the foregoing first receiver. When the computer software instruction is run on a computer, the computer is enabled to perform the optical signal processing method according to any one of the first aspect.

According to a fifth aspect, an embodiment provides a program product, where the program product includes a computer program. The computer program is stored in a computer-readable storage, and at least one processor of a communications device may read the computer program from the readable storage medium. The at least one processor may execute the computer program to enable a receiver to implement the optical signal processing method provided in the first aspect.

In addition, for an effect brought by any one of the implementation manners in the second aspect to the fifth aspect, refer to the effect brought by the different implementation manners in the first aspect. Details are not described herein again.

According to the optical signal processing method and apparatus in the embodiments, the first receiver obtains the first sending signal, determines the estimation information of the backward optical signal based on the first sending signal, and obtains the second sending signal based on the estimation information of the backward optical signal, to determine the estimation information of the backward optical signal based on the first sending signal. In this way, impact of the backward optical signal is removed from a signal received by the first receiver, so that the second sending signal sent by the second transmitter is restored. This can reduce the impact of the backward optical signal on effective signal transmission, and improve a signal-to-noise ratio. Therefore, single-fiber bidirectional transmission can be applied to long-distance transmission.

BRIEF DESCRIPTION OF DRAWINGS

The following briefly describes the accompanying drawings required for describing embodiments or the prior art.

DETAILED DESCRIPTION OF THE EMBODIMENTS

The following clearly describes the solutions in the embodiments with reference to the accompanying drawings.

The transmitter mentioned in the embodiments refers to an optical transmitter, which is configured to transmit an optical signal. The receiver mentioned in the embodiments refers to an optical receiver, which is configured to receive an optical signal.

Figure 1:
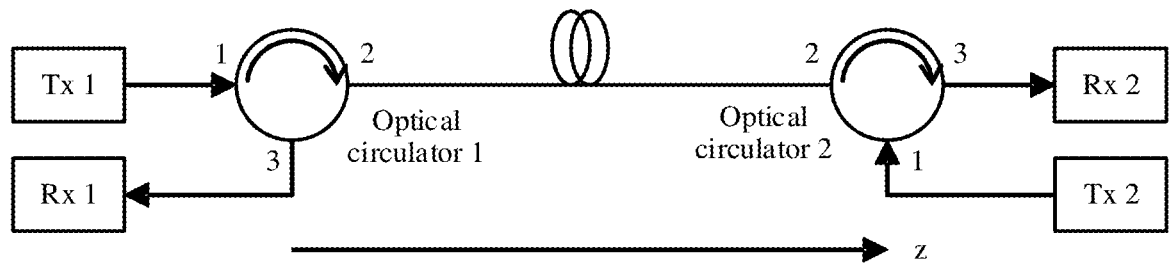
FIG. 1 is a schematic diagram of an application scenario according to an embodiment.

FIG. 1 is a schematic diagram of an application scenario according to an embodiment. As shown in FIG. 1, the application scenario includes a first end and a second end. The first end communicates with the second end by using a single-fiber bidirectional optical transmission system. The single-fiber bidirectional optical transmission system refers to a system in which an optical fiber is used to transmit both sent and received optical signals. As shown in FIG. 1, an optical fiber between two optical circulators is a single-fiber bidirectional optical fiber. The first end includes a first transmitter Tx 1 and a first receiver Rx 1, and the second end includes a second transmitter Tx 2 and a second receiver Rx 2.

An optical circulator is a three-port non-reciprocal optical component. When an optical signal is input from any port, the optical signal can be output from a next port in a specific numeric order at a small loss. However, loss from the port to all other ports is large, and the port becomes a non-communication port (as shown in FIG. 1, an optical signal that is input from a port 1 of the optical circulator, may be output from a port 2 of the circulator, but cannot be output from a port 3 of the optical circulator; and an optical signal that is input from the port 2 of the optical circulator, may be output from the port 3 of the circulator, but cannot be output from the port 1 of the optical circulator). In this way, an optical signal sent by the Tx 1 is sent to a port 1 of an optical circulator 1 at the first end, and can be output only from a port 2 of the optical circulator 1 at a local end and sent to an optical fiber. After being transmitted through the optical fiber, the optical signal is sent to a port 2 of an optical circulator 2 at a second end, and can be output only from a port 3 of the optical circulator 2 at the second end and sent to the Rx 2. Similarly, an optical signal sent by the Tx 2 passes through a port 1 of the optical circulator 2, can be output only from the port 2 of the optical circulator 2 and sent to the port 2 of the optical circulator 1 through a same optical fiber, and can be output only from a port 3 of the optical circulator 1 and sent to the Rx 1. Therefore, because the optical circulator is used, optical signals are actually transmitted to two different directions in a same optical fiber. This is referred to as single-fiber bidirectional transmission.

In the single-fiber bidirectional optical transmission system, Rayleigh backscattering is usually used, which affects a receiver to receive a signal sent from a peer end. A local end and a peer end are based on a receiver or a transmitter described herein. An end at which the receiver or the transmitter described herein is located is referred to as the local end. Correspondingly, an end at which a signal is sent to a transmitter of the described receiver is located, or an end at which a receiver receives a signal sent by the described transmitter is located, is referred to as the peer end. For example, if the Rx 1 is described, the first end may be referred to as the local end, and the second end may be referred to as the peer end. On the contrary, if the Tx 2 is described, the first end may be referred to as the peer end, and the second end is referred to as the local end.

According to the optical signal processing method in the embodiments, a backward optical signal may be estimated by using a first sending signal, and impact of the backward optical signal is removed from a signal received by the first end, so that a signal sent by the second end is restored.

In the embodiments, an example in which an end at which the first receiver Rx 1 is located is the local end (in other words, the first end is the local end) and the peer end is the second end is used for description. When the local end is the second end, the peer end is the first end, a same implementation principle may be used. Details are not described in the embodiments.

At least a part of a first optical fiber and a part of a second optical fiber in the embodiments overlap. FIG. 1 is used for illustration. The first optical fiber may refer to an optical fiber between the Tx 1 and the Rx 2. The optical fiber between the Tx 1 and the Rx 2 includes an optical fiber between the Tx 1 and the port 1 of the optical circulator 1, an optical fiber between the port 2 of the optical circulator 1 and the port 2 of the optical circulator 2, and an optical fiber between the port 3 of the optical circulator 2 and the Rx 2. The second optical fiber may refer to an optical fiber between the Tx 2 and the Rx 1. The optical fiber between the Tx 2 and the Rx 1 includes an optical fiber between the Tx 2 and the port 1 of the optical circulator 2, an optical fiber between the port 2 of the optical circulator 2 and the port 2 of the optical circulator 1, and an optical fiber between the port 3 of the optical circulator 1 and the Rx 1. As shown in FIG. 1, an optical fiber between two optical circulators in the first optical fiber and the second optical fiber is an overlapping part of the optical fibers. The first optical fiber may also refer to an optical fiber between the optical circulator 1 and the optical circulator 2, and the second optical fiber may refer to an optical fiber between the optical circulator 2 and the optical circulator 1. As shown in FIG. 1, the first optical fiber and the second optical fiber are a same optical fiber.

Figure 2:
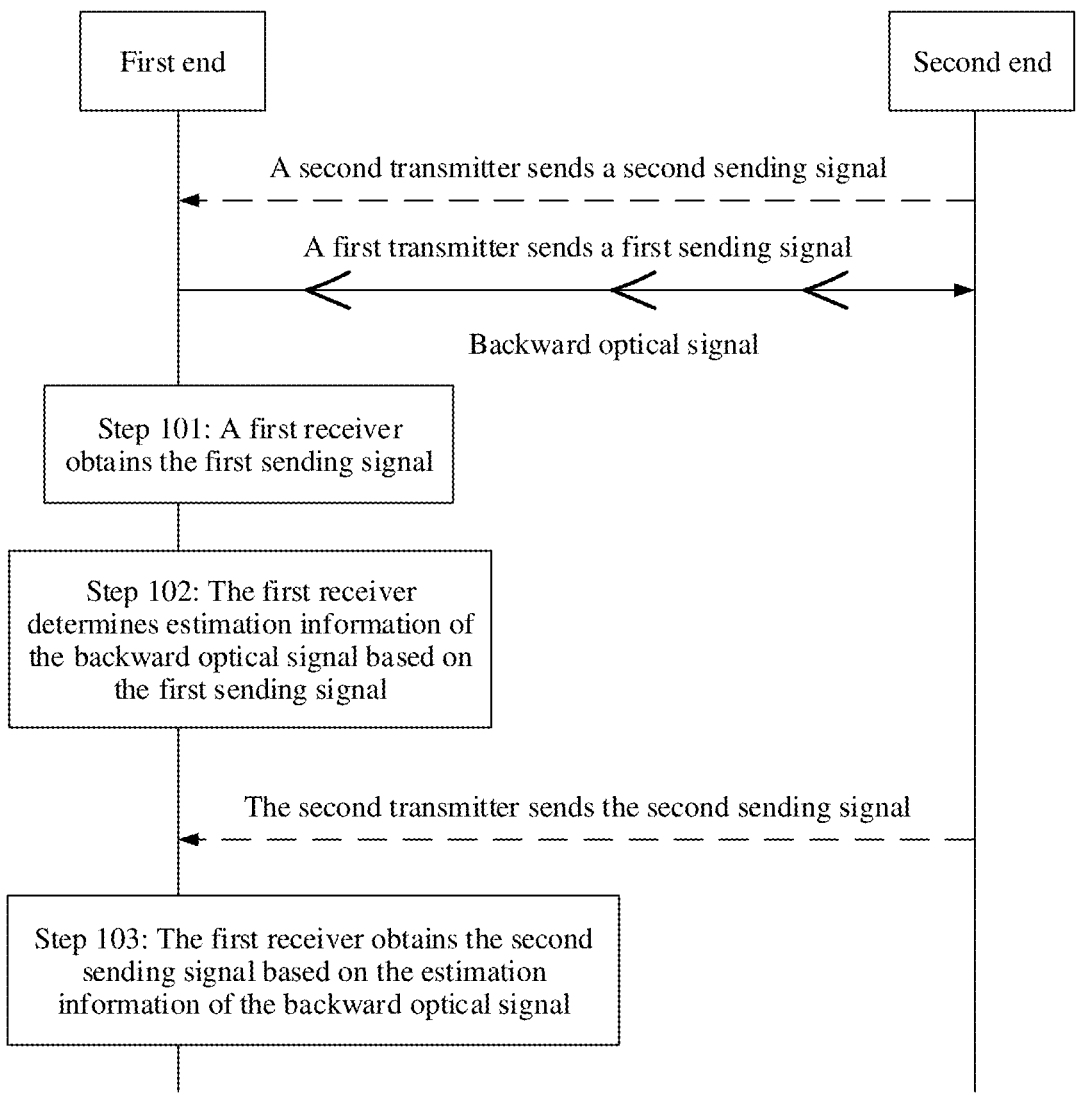
FIG. 2 is a flowchart of an optical signal processing method according to an embodiment.

FIG. 2 is a flowchart of an optical signal processing method according to an embodiment. As shown in FIG. 2, the method in this embodiment may include the following steps.

Step 101: A first receiver obtains a first sending signal.

To estimate a backward optical signal, the first receiver obtains the first sending signal in this step. For example, a processing unit of the first receiver may obtain the first sending signal, or a processing unit of a first end may obtain the first sending signal. The processing unit of the first end may be a processing unit shared by a first transmitter and a first receiver. The processing unit of the first receiver or the processing unit of the first end may be an electrical processing unit, or may be an optical processing unit.

The first sending signal is a signal sent by the first transmitter to a second receiver through a first optical fiber. As shown in FIG. 2, when the first sending signal is transmitted, a backward optical signal whose transmission direction is opposite to a transmission direction of the first sending signal is generated. The backward optical signal needs to be estimated by using the following steps, to remove impact of the backward optical signal from a signal received by the first receiver.

Optionally, the first sending signal may be an optical signal, for example, a first sending optical signal.

Optionally, the first sending signal may further be an electrical signal. A first transmitter at the first end performs electrical-to-optical conversion on the first sending signal to generate the first sending optical signal, and transmits the first sending optical signal to a second receiver at a second end through the first optical fiber. The first sending signal may be an analog signal. For example, for an encoded signal, the electrical-to-optical conversion is performed on the encoded signal. The first sending signal may alternatively be a digital signal. When the first sending signal is the digital signal, the first transmitter further encodes the digital signal to obtain the analog signal, such as the encoded signal and performs the electrical-to-optical conversion on the encoded signal.

Step 102: The first receiver determines estimation information of a backward optical signal based on the first sending signal.

The backward optical signal is generated during transmission of the first sending signal, the backward optical signal is transmitted through at least one fiber section in the first optical fiber, and a transmission direction of the backward optical signal in the at least one fiber section is opposite to the transmission direction of the first sending signal. For example, the first sending optical signal that is generated after the electrical-to-optical conversion is performed on the first sending signal is transmitted through the optical fiber between the optical circulator 1 and the optical circulator 2 shown in FIG. 1. When the first sending optical signal reaches a certain point of the optical fiber, the backward optical signal whose transmission direction is opposite to the transmission direction of the first sending optical signal is generated at the certain point, and is propagated to the first end along the first optical fiber.

The first receiver determines the estimation information of the backward optical signal based on the first sending signal. The estimation information of the backward optical signal can reflect all or a portion of information carried by the backward optical signal. As described above, the estimation information of the backward optical signal may be determined by the processing unit shared by the first transmitter and the first receiver, or may be determined by the processing unit of the first receiver. In this case, the estimation information of the backward optical signal is actually an electrical signal (which may be a digital electrical signal or an analog electrical signal). In this case, the processing unit of the first receiver or the processing unit of the first end may be an electrical processing unit. Theoretically, because processing such as equalization of the optical signal can alternatively be implemented at an optical layer, the first receiver may also determine the estimation information of the backward optical signal at the optical layer based on the first sending signal. In this case, the estimation information of the backward optical signal may alternatively be an optical signal (in this case, the first sending signal is generally also an optical signal). In this case, the processing unit of the first receiver or the processing unit of the first end may be the optical processing unit. Thus, the estimation information of the backward optical signal may alternatively be a portion of internal data that reflects the information carried by the backward optical signal, and a specific form of the data may be flexibly set based on a requirement.

Step 103: The first receiver obtains a second sending signal based on the estimation information of the backward optical signal.

The second sending signal is a signal sent by a second transmitter to the first receiver through a second optical fiber.

Optionally, the second sending signal may be an optical signal, such as a second sending optical signal.

Optionally, the second sending signal may further be an electrical signal. An implementation in which the second transmitter at the second end sends the second sending signal is as follows: the second transmitter at the second end performs the electrical-to-optical conversion on the second sending signal to generate the second sending optical signal and transmits the second sending optical signal to the first receiver at the first end through the second optical fiber. The second sending signal may be an analog signal, such as an encoded signal. The electrical-to-optical conversion is performed on the encoded signal. The second sending signal may alternatively be a digital signal. When the second sending signal is the digital signal, the second transmitter further encodes the digital signal to obtain the analog signal, in other words, the encoded signal, and performs the electrical-to-optical conversion on the encoded signal.

At least a part of the second optical fiber and a part of the first optical fiber overlap, and in the overlapping part of optical fibers, a transmission direction of the first sending signal is opposite to a transmission direction of the second sending signal.

For example, the second sending optical signal and the backward optical signal generated during transmission are transmitted to the first receiver at the first end through the optical fiber, and the first receiver obtains a coherent received signal in a coherent receiving manner and removes the estimation information of the backward optical signal from the coherent received signal. In this way, the second sending signal can be restored.

The foregoing first receiver is a coherent receiver. An implementable manner of the foregoing step 103 is as follows: the first receiver performs coherent reception on an optical signal received by the first receiver in a coherent receiving manner, to obtain a coherent received signal, and determines the second sending signal based on the coherent received signal and the estimation information of the backward optical signal. The second sending signal is determined based on the coherent received signal and the estimation information of the backward optical signal.

An implementation may be as follows: the first receiver performs the coherent reception (the coherent reception includes performing optical-layer frequency mixing (hybrid) on the received optical signal) to obtain the coherent received signal, where the coherent received signal is an optical signal. After the coherent received signal is obtained, the second sending signal may be obtained by removing the estimation information of the backward optical signal from the coherent received signal.

Another implementation may further be as follows: the first receiver performs the coherent reception (the coherent reception includes performing optical-layer frequency mixing, the optical-to-electrical conversion, and analog-to-digital conversion (ADC) on the received optical signal) to obtain the coherent received signal, where the coherent received signal is an electrical signal. After the coherent received signal is obtained, the second sending signal may be obtained by removing the estimation information of the backward optical signal from the coherent received signal.

Generally, a signal restored by the coherent receiver is a linear superposition of the second sending signal (or its estimation information) and the backward optical signal (or its estimation information), and the impact of the backward optical signal can be directly removed after the backward optical signal is estimated.

It may be understood that, if the first receiver uses a direct detection manner, according to a square law, a signal restored by the first receiver includes multiplication of the second sending signal and the backward optical signal. Although implementation complexity is much higher, theoretically, cancellation may also be performed using a method similar to a method used during coherent reception. Details are not described herein.

In this embodiment, the first receiver obtains the first sending signal, determines the estimation information of the backward optical signal based on the first sending signal, and obtains the second sending signal based on the estimation information of the backward optical signal, to determine the estimation information of the backward optical signal by using the first sending signal. In this way, the impact of the backward optical signal is removed from the signal received by the first receiver, so that the second sending signal sent by the second transmitter is restored. According to this embodiment, the impact of the backward optical signal on effective signal transmission can be reduced, and a signal-to-noise ratio can be improved. Therefore, single-fiber bidirectional transmission can be applied to long-distance transmission.

It should be noted that the backward optical signal may include any one or more of a Rayleigh backscattering signal, a backward reflected signal, and the like. The Rayleigh backscattering signal has great impact on the single-fiber bidirectional system. On one hand, the backward reflected signal may be suppressed by using an APC (Angled Physical Contact) optical fiber connector. On the other hand, a method similar to a method for suppressing the Rayleigh backscattering signal in this embodiment may also be used to suppress the backward reflected optical signal or other types of the backward optical signal.

The following describes in detail a solution of the method embodiment shown in FIG. 2 by using an example of suppressing impact of the Rayleigh backscattering signal in several embodiments. As described above, a similar solution may be used to suppress the impact of the backward reflected optical signal or the other types of the backward optical signal. Details are not described again.

Figure 3:
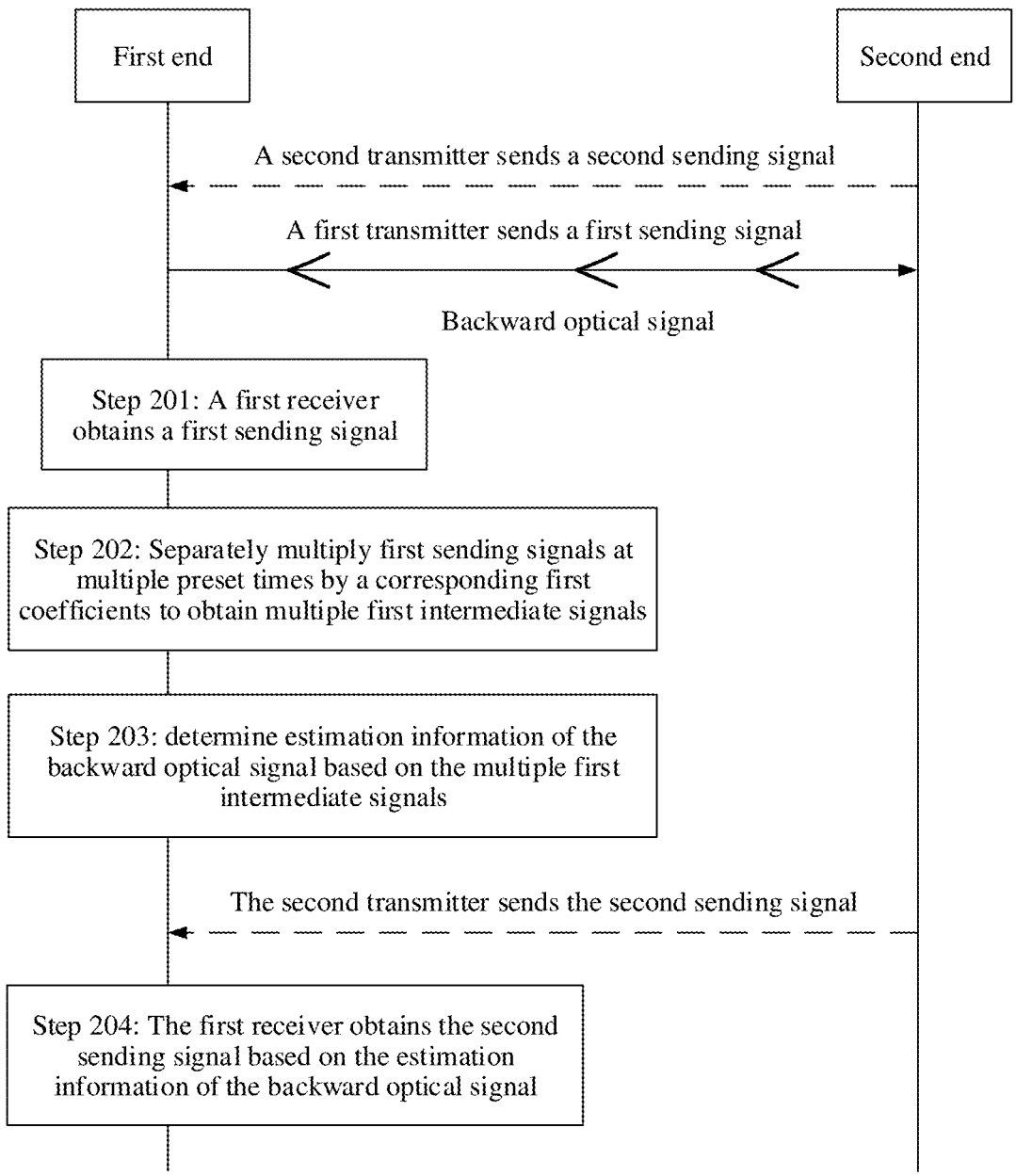
FIG. 3 is a flowchart of another optical signal processing method according to an embodiment.

FIG. 3 is a flowchart of another optical signal processing method according to an embodiment. As shown in FIG. 3, the method in this embodiment may include the following steps.

Step 201: A first receiver obtains a first sending signal.

For description of step 201, refer to step 101 in the embodiment shown in FIG. 2. Details are not described herein again.

The first sending signal in this embodiment includes first sending signals at multiple preset times before a current moment. The preset time may be a preset time period, or may be a preset time point, which may be flexibly set based on a requirement. The first sending signals at the multiple preset times before a current moment t include the first sending signal at a moment $t-n\Delta T$, where n ranges from 1 to N, N is a calculation precision parameter, and N is a positive integer. A larger value of N indicates a higher calculation precision of estimation information of a Rayleigh backscattering signal.

Step 202: The first receiver separately multiplies the first sending signals at the multiple preset times by a corresponding first coefficient, to obtain multiple first intermediate signals.

The first sending signal at each preset time corresponds to one first coefficient; the first coefficient is related to any one or more of a strength attenuation coefficient, a propagation coefficient, a group velocity, and a Rayleigh backscattering coefficient when an optical signal is transmitted in a first optical fiber.

In this step, N first intermediate signals may be obtained.

Step 203: The first receiver determines the estimation information of the Rayleigh backscattering signal based on the multiple first intermediate signals.

The multiple first intermediate signals are obtained based on the first sending signals at the multiple preset times before the current moment t and the corresponding first coefficient, and the estimation information of the Rayleigh backscattering signal is determined based on the multiple first intermediate signals.

In an implementable manner, the multiple first intermediate signals are summed to obtain the estimation information of the Rayleigh backscattering signal.

Step 204: The first receiver obtains a second sending signal based on the estimation information of the Rayleigh backscattering signal.

For description of step 204, refer to step 103 in the embodiment shown in FIG. 2. Details are not described herein again.

The first sending signal at each preset time may include a first sending signal in a first polarization state and a first sending signal in a second polarization state. An implementation of step 202 may be: separately multiplying first sending signals in the first polarization state at the multiple preset times by a corresponding first coefficient in the first polarization state, to obtain multiple first intermediate signals in the first polarization state; separately multiplying first sending signals in the second polarization state at the multiple preset times by a corresponding first coefficient in the second polarization state, to obtain multiple first intermediate signals in the second polarization state.

The first coefficient in the first polarization state may be the same as or different from the first coefficient in the second polarization state.

The following describes two application scenarios. In one application scenario, no optical amplifier (OA) is disposed in the first optical fiber, an effective length of the first optical fiber is L, the multiple preset times are N preset times, an interval between adjacent preset times is $\Delta T$, $\Delta T \cdot v = 2 L/N$, and v is the group velocity at which the optical signal is transmitted in the first optical fiber. The effective length of the first optical fiber is a length that affects obtaining of the second sending signal in the first optical fiber. For example, it is assumed that a length of the first optical fiber is 100 km. However, because power of the Rayleigh backscattering signal is already relatively low in 40 km of a rear part of the first optical fiber, this may not be considered. Therefore, only a length of 60 km in a front part of the first optical fiber is considered. Therefore, the effective length of the first optical fiber is 60 km. Thus, the effective length of the first optical fiber may also be the length of the first optical fiber. Additionally, the effective length of the first optical fiber cannot be greater than the length of the first optical fiber. In addition, the length of the first optical fiber may also be used for calculation, and a method is similar to a method for calculating the effective length of the first optical fiber. Details are not described again.

An implementable manner of the foregoing step 202 includes: separately multiplying the first sending signals in the first polarization state at the N preset times by the corresponding first coefficient in the first polarization state, to obtain N first intermediate signals in the first polarization state; separately multiplying the first sending signals in the second polarization state at the N preset times by the corresponding first coefficient in the second polarization state, to obtain N first intermediate signals in the second polarization state; and N is the calculation precision parameter, and N is a positive integer.

An example in which the first polarization state is an x polarization state and the second polarization state is a y polarization state is as follows.

The first sending signal may be represented as $$\begin{bmatrix} E_{T1x} \\ E_{T1y} \end{bmatrix},$$

where $E_{T1x}$ represents a first sending signal in the x polarization state, and $E_{T1y}$ represents a first sending signal in the y polarization state. It is assumed that $x(t)=E_{T1x}(t)$ $y(t)=E_{T1y}(t)$, where the first sending signal in the first polarization state at the preset times may be represented as $x(t-n\Delta T)$, and the first coefficient in the first polarization state may be represented as $C_{xn}$, where N ranges from 1 to N. In other words, for the first sending signal in the x polarization state $x(t-n\Delta T)$ before the current moment t, a corresponding first coefficient in the x polarization state is $C_{xn}$, and a first intermediate signal in the x polarization state is $x(t-n\Delta T) \cdot C_{xn}$, where n ranges from 1 to N.

The first sending signals in the second polarization state at the multiple preset times may be represented as $y(t-n\Delta T)$, and the first coefficient in the first polarization state may be represented as $C_{yn}$, where n ranges from 1 to N. In other words, for the first sending signal in the y polarization state $y(t-n\Delta T)$ before the current moment t, a corresponding first coefficient in the y polarization state is $C_{yn}$, and a first intermediate signal in the y polarization state is $y(t-n\Delta T) \cdot C_{yn}$, where n ranges from 1 to N.

An implementation of step 203 may be: determining estimation information of a Rayleigh backscattering signal in the first polarization state based on the multiple first intermediate signals in the first polarization state and determining estimation information of a Rayleigh backscattering signal in the second polarization state based on the multiple first intermediate signals in the second polarization state.

The foregoing x polarization state and y polarization state are used as an example for further description. Here, estimation information of a backward optical signal in the x polarization state $\overrightarrow{E_{b1x}}$ is determined according to formula (1).

$$\overrightarrow{E_{b1x}} = \sum_{n=1}^{N} x(t-n\Delta T) \cdot C_{xn} \qquad (1)$$

Estimation information of a backward optical signal in the y polarization state $\overrightarrow{E_{b1y}}$ is determined according to formula (2).

$$\overrightarrow{E_{b1y}} = \sum_{n=1}^{N} y(t-n\Delta T) \cdot C_{yn} \qquad (2)$$

In another application scenario, at least one optical amplifier is disposed in the first optical fiber, and the at least one optical amplifier divides the first optical fiber into at least two optical amplifier regenerator sections, a length of each regenerator section is L (an example in which lengths of the regenerator sections are the same is used for description herein, calculation is performed by using an effective length of each regenerator section, and a case in which lengths or effective lengths of the regenerator sections are different may be deduced by analogy, and details are not described again). The multiple preset times are pN preset times, an interval between adjacent preset times is $\Delta T$, $\Delta T \cdot v = 2L/N$, where v is the group velocity at which the optical signal is transmitted in the first optical fiber. A schematic diagram of the another application scenario may be shown in FIG. 4.

An implementation of step 203 includes: separately multiplying first sending signals in the first polarization state at the pN preset times by the corresponding first coefficient in the first polarization state, to obtain pN first intermediate signals in the first polarization state; separately multiplying first sending signals in the second polarization state at the pN preset times by the corresponding first coefficient in the second polarization state, to obtain pN first intermediate signals in the second polarization state; where N is the calculation precision parameter, N is a positive integer, the first coefficient is further related to a value of N, and p is a total quantity of the optical amplifier regenerator sections.

An example in which the first polarization state is an x polarization state and the second polarization state is a y polarization state is used as follows.

The first sending signals in the first polarization state at the multiple preset times may be represented as $x(t-n\Delta T)$, and the first coefficient in the first polarization state may be represented as $C_{xn}$, where n ranges from 1 to pN. In other words, for the first sending signal in the x polarization state $x(t-n\Delta T)$ before the current moment t, a corresponding first coefficient in the x polarization state is $C_{xn}$, and a first intermediate signal in the x polarization state is $x(t-n\Delta T) \cdot C_{xn}$, where n ranges from 1 to pN.

The first sending signals in the second polarization state at the multiple preset times may be represented as $y(t-n\Delta T)$, and the first coefficient in the first polarization state may be represented as $C_{yn}$, where n ranges from 1 to pN. In other words, for the first sending signal in the y polarization state $y(t-n\Delta T)$ before the current moment t, a corresponding first coefficient in the y polarization state is $C_{yn}$, and a first intermediate signal in the y polarization state is $y(t-n\Delta T)$ $C_{yn}$, where n ranges from 1 to pN.

An implementation of step 204 may be: determining estimation information of a Rayleigh backscattering signal in the first polarization state based on the multiple first intermediate signals in the first polarization state, and determining estimation information of a Rayleigh backscattering signal in the second polarization state based on the multiple first intermediate signals in the second polarization state.

The foregoing x polarization state and y polarization state are used as an example for further description. Here, estimation information of a backward optical signal in the x polarization state $\overrightarrow{E_{b1x}}$ is determined according to formula (3).

$$\overrightarrow{E_{b1x}} = \sum_{n=1}^{pN} x(t-n\Delta T) \cdot C_{xn} \qquad (3)$$

Estimation information of a backward optical signal in the y polarization state $\overrightarrow{E_{b1y}}$ is determined according to formula (4).

$$\overrightarrow{E_{b1y}} = \sum_{n=1}^{pN} y(t-n\Delta T) \cdot C_{yn} \qquad (4)$$

For any one of the foregoing application scenarios, a corresponding implementation of step 205 is: obtaining the second sending signal based on estimation information of a backward optical signal in the first polarization state and estimation information of a backward optical signal in the second polarization state.

The foregoing x polarization state and y polarization state are used as an example for further description. For example, estimation information $\widetilde{E'_{b1x}}$ of $E'_{b1x}$ is determined according to formula (5). Estimation information $\widetilde{E'_{b1y}}$ of $E'_{b1y}$ is determined according to formula (6). $\widetilde{E'_{b1x}}$ represents the estimation information of $E'_{b1x}$, and $\widetilde{E'_{b1y}}$ represents the estimation information of $E'_{b1y}$. $\theta_b$ represents an included angle between $E_{b1}$ and a polarization state of the first receiver, and $\theta_b$ remains unchanged. $E_{b1}$ represents the backward optical signal. k represents a response coefficient of coherent reception of the first receiver.

$$\widetilde{E'_{b1x}} = k \cdot \widetilde{E_{b1x}} \cdot \cos\theta_b - k \cdot \widetilde{E_{b1y}} \cdot \sin\theta_b \quad (5)$$

$$\widetilde{E'_{b1y}} = k \cdot \widetilde{E_{b1x}} \cdot \sin\theta_b + k \cdot \widetilde{E_{b1y}} \cdot \cos\theta_b \quad (6)$$

When N is large enough, $E'_{b1x}$ and $E'_{b1y}$ are determined according to formulas (7) and (8).

$$\lim_{N\to\infty} \widetilde{E'_{b1x}} = E'_{b1x} \quad (7)$$

$$\lim_{N\to\infty} \widetilde{E'_{b1y}} = E'_{b1y} \quad (8)$$

$k \cdot P_{SR2}$.

$$\begin{bmatrix} E_{SR2x} \\ E_{SR2y} \end{bmatrix}$$

is determined according to formula (9), and the second sending signal is further determined.

$$\begin{bmatrix} E_{SR2x} \\ E_{SR2y} \end{bmatrix}$$

represents the second sending signal, and $P_{SR2}$ represents a Jones polarization state matrix of a signal that is sent by a second transmitter and that is received by the first receiver.

$$\lim_{N\to\infty}\left(E_{R1} - \begin{bmatrix} \widetilde{E'_{b1x}} \\ \widetilde{E'_{b1y}} \end{bmatrix}\right) = k \cdot P_{SR2} \cdot \begin{bmatrix} E_{SR2x} \\ E_{SR2y} \end{bmatrix} \quad (9)$$

$E_{R1}$ represents a signal received by the receiver, where the signal undergoes optical-to-electrical conversion, and $$\begin{bmatrix} \widetilde{E'_{b1x}} \\ \widetilde{E'_{b1y}} \end{bmatrix}$$

may be estimated by using the first sending signal $$\begin{bmatrix} E_{T1x} \\ E_{T1y} \end{bmatrix}$$

according to formulas (1) to (8).

In this embodiment, the first receiver obtains the first sending signal, separately multiplies the first sending signals at the multiple preset times by the corresponding first coefficient, to obtain the multiple first intermediate signals, and determines the estimation information of the backward optical signal based on the multiple first intermediate signals. The first receiver obtains the second sending signal based on the estimation information of the backward optical signal, and removes impact of the backward optical signal from the signal received by the first receiver, to restore the second sending signal sent by the second transmitter. According to this embodiment, the impact of the backward optical signal on effective signal transmission can be reduced, and a signal-to-noise ratio can be improved. Therefore, single-fiber bidirectional transmission can be applied to long-distance transmission.

For the foregoing application scenario without an optical amplifier, $$C_{xn} = e^{-\left(\frac{\alpha_x}{2}+j\beta_x\right)\Delta Tv\cdot n} \cdot \Delta\rho_x\left(\frac{\Delta Tv}{2}\cdot n\right),$$

$\alpha_x$ is a strength attenuation coefficient in the x polarization state, $\beta_x$ is a propagation constant in the x polarization state, and $$\Delta\rho_x\left(\frac{\Delta Tv}{2}\cdot n\right)$$

is a backscattering coefficient in the x polarization state at $$\frac{\Delta Tv}{2}\cdot n. \quad C_{yn} = e^{-\left(\frac{\alpha_y}{2}+j\beta_y\right)\Delta Tv\cdot n} \cdot \Delta\rho_y\left(\frac{\Delta Tv}{2}\cdot n\right),$$

$\alpha_y$ is a strength attenuation coefficient in the y polarization state, $\beta_y$ is a propagation constant in the y polarization state, and $$\Delta\rho_y\left(\frac{\Delta Tv}{2}\cdot n\right)$$

is a backscattering coefficient in the y polarization state at $$\frac{\Delta Tv}{2}\cdot n.$$

The following briefly describes principles of the foregoing calculation process of the application scenario without an optical amplifier:

Signal propagation along an optical fiber can be expressed as follows:

$$\vec{E}(t,z) = P(z)\cdot\vec{E}_s(t-z/v)\cdot e^{-\alpha z/2}\cdot e^{-j\beta z} \quad (10)$$

$\alpha$ is the strength attenuation coefficient, $\beta$ is the propagation constant, v is the group velocity, P is the Jones polarization state matrix, $\vec{E}_s$ is an initial signal, and z is a distance along a propagation direction of the optical fiber.

A signal sent by a Tx 1 passes through a distance L, and a Rayleigh backscattering signal at an Rx 1 end may be represented as:

$$\vec{E_b}(t) = \int_0^L M(z) \cdot \vec{E_s}(t - 2z/v) \cdot e^{-\alpha z} \cdot e^{-j2\beta z} \cdot \rho(z) dz \approx \quad (11)$$

$$\sum_{n=1}^N M(n\Delta l) \cdot \vec{E_s}(t - 2n\Delta l/v) \cdot e^{-\alpha n\Delta l} \cdot e^{-j2\beta n\Delta l} \cdot \Delta \rho(n\Delta l)$$

M(z) is a normalized Jones matrix, M(z)=PT(z)*P(z). Δρ(z) is the Rayleigh backscattering coefficient, which is a Gaussian random variable. Δρ(z) is related to temperature and stress of each section of the optical fiber and is a variable that slowly changes with time (relative to a change in data transmission), and the original text is simplified. Δl=L/N, where N is relatively large.

In a common communications fiber (with low birefractivity, such as a G.652 fiber), a polarization state of the Rayleigh backscattering signal basically remains unchanged. Therefore, (11) may be simplified as:

$$\vec{E_b}(t) = M \cdot \sum_{n=1}^N \vec{E_s}(t - 2n\Delta l/v) \cdot e^{-\alpha n\Delta l} \cdot e^{-j2\beta n\Delta l} \cdot \Delta \rho(n\Delta l) \quad (12)$$

In this embodiment, a Rayleigh backscattering signal of the first sending signal is estimated by using the first sending signal of the first transmitter, and impact of the Rayleigh backscattering signal is removed from the signal received by the first receiver, to restore the second sending signal sent by the second transmitter.

If an optical transmission system is a coherent optical transmission system, a signal restored by a coherent receiver at the Rx 1 is:

$$E_{R1} = \begin{bmatrix} E_{R1x} \\ E_{R1y} \end{bmatrix} = \quad (13)$$

$$k \cdot P_{SR2} \cdot \begin{bmatrix} E_{SR2x} \\ E_{SR2y} \end{bmatrix} + k \cdot P_{b1} \cdot \begin{bmatrix} E_{b1x} \\ E_{b1y} \end{bmatrix} = k \cdot P_{SR2} \cdot \begin{bmatrix} E_{SR2x} \\ E_{SR2y} \end{bmatrix} + \begin{bmatrix} E'_{b1x} \\ E'_{b1y} \end{bmatrix}$$

$E_{R1}$ is an electrical signal restored by the coherent receiver at the Rx 1, which includes a signal $$\begin{bmatrix} E_{SR2x} \\ E_{SR2y} \end{bmatrix}$$

sent by the Tx 2 and received at the Rx 1 (x,y represents two orthogonal polarization states), and a Rayleigh backscattering signal $$\begin{bmatrix} E_{b1x} \\ E_{b1y} \end{bmatrix}$$

generated by the signal sent by the Tx 1. k indicates a response coefficient of the coherent receiver. $P_{SR2}$ represents the Jones polarization state matrix of the signal sent by the Tx 2 and received at the Rx 1, which is a variable that slowly changes with time. $P_{b1}$ represents a Jones polarization state matrix of a Rayleigh backscattering signal generated by the signal sent by the Tx 1, and as described above, it basically remains unchanged.

Estimation information of a Rayleigh backscattering signal of a Tx 1 signal (as $$\begin{bmatrix} E'_{b1x} \\ E'_{b1y} \end{bmatrix}$$

in formula (13)) is generated by using a sending signal of the Tx 1, and the estimation information is removed from a signal received by the Rx 1, which is equivalent to removing the impact of the Rayleigh backscattering signal. This ensures that the signal sent by the Tx 2 is correctly received.

After impact of Rayleigh backscattering is reduced or even removed, the SNR for receiving signals can be greatly improved, high-rate and long-distance optical signal transmission is supported, and overall SE of the optical transmission system can be greatly improved (theoretically, the SE or transmission capacity can be doubled while keeping a distance unchanged).

$$\begin{bmatrix} E'_{b1x} \\ E'_{b1y} \end{bmatrix}$$

in formula (13) may be given by using the foregoing formula (5) and formula (6).

$\widehat{E'_{b1x}}$, $\widehat{E'_{b1y}}$, $\widehat{E_{b1x}}$, and $\widehat{E_{b1y}}$ represent the estimation information of $E'_{b1x}$, $E'_{b1y}$, $E_{b1x}$, and $E_{b1y}$. $\theta_b$ represents an included angle between $E_{b1}$ and a polarization state of the coherent receiver at the Rx 1, as described above, $\theta_b$ remains unchanged.

According to formula (12) and assuming that 2Δl=ΔT·v, formula (14) may be obtained:

$$\widehat{E_{b1x}} = \sum_{n=1}^N [E_{T1x}(t - n\Delta T)] \cdot e^{-(\alpha_x + j2\beta_x)n\Delta Tv/2} \cdot \Delta \rho_x(n\Delta Tv/2) \quad (14)$$

A subscript x represents a polarization state, and $E_{T1x}$ is an electrical signal corresponding to an x polarization state signal sent by the Tx 1.

Assuming that x(t)=$E_{T1x}$(t) and $$C_{xn} = e^{-(\frac{\alpha_x}{2} + j\beta_x)\Delta Tv \cdot n} \cdot \Delta \rho_x\left(\frac{\Delta Tv}{2} \cdot n\right),$$

the foregoing formula (1) may be obtained according to formula (14).

Similarly, assuming that y(t)=$E_{T1y}$(t) and $$y(t) = E_{T1y}(t) \text{ and } C_{yn} = e^{-(\frac{\alpha_y}{2} + j\beta_y)\Delta Tv \cdot n} \cdot \Delta \rho_y\left(\frac{\Delta Tv}{2} \cdot n\right),$$

the foregoing formula (2) may be obtained.

Formulas (1) and (2) are similar to an expression of a transversal filter in signal equalization. According to a related theory of the signal equalization:

$$\lim_{N \to \infty} \widehat{E_{b1x}} = E_{b1x} \quad (15)$$

$$\lim_{N \to \infty} \widehat{E_{b1y}} = E_{b1y} \quad (16)$$

With reference to formula (5) and formula (6), because $\theta_b$, 保持基本不变, the foregoing formula (7) and formula (8) may be obtained according to formula (15) and formula (16).

In this way, formula (9) may be obtained according to the formula (13).

In formula (9), $E_{R1}$ is an electrical signal received by the Rx 1.

$$\begin{bmatrix} \widehat{E_{b1x}} \\ \widehat{E_{b1y}} \end{bmatrix}$$

can be estimated based on the sending signal of the $$\begin{bmatrix} E_{T1x} \\ E_{T1y} \end{bmatrix}$$

according to formulas (1) to (16), and $k \cdot P_{SR2}$.

$$\begin{bmatrix} E_{SR2x} \\ E_{SR2y} \end{bmatrix}$$

is a common signal received by the coherent receiver. Generally, a coherent receiver can restore a signal sent by the Tx 2 to the Rx 1.

For the foregoing application scenario with an optical amplifier, $C_{xn} = e^{-\alpha_x(n \% N)\Delta Tv/2} \cdot e^{-j\beta_x n\Delta Tv} \cdot \Delta\rho_x(n\Delta Tv/2)$, $\alpha_x(n \% N)$ is the strength attenuation coefficient in the x polarization state at n % N, % is a modulo operator, $\beta_x$ is a propagation constant in the x polarization state, and $\Delta\rho_x(n\Delta Tv/2)$ is a backscattering coefficient in the x polarization state at $n\Delta Tv/2$. $C_{yn} = e^{-\alpha_y(n \% N)\Delta Tv/2} \cdot e^{-j\beta_y n\Delta Tv} \cdot \Delta\rho_y(n\Delta Tv/2)$, $\alpha_y$ is a strength attenuation coefficient in the y polarization state at n % N, $\beta_y$ is the propagation constant in the y polarization state, and $\Delta\rho_y(n\Delta Tv/2)$ is a backscattering coefficient in the y polarization state at $n\Delta Tv/2$.

The following briefly describes principles of the foregoing calculation process of the application scenario with an optical amplifier.

Figure 4:
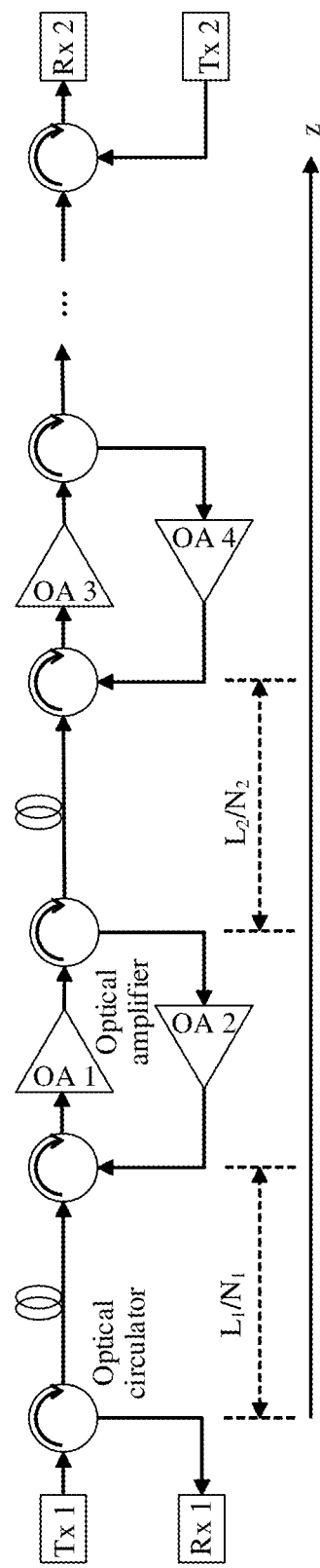
FIG. 4 is a flowchart of another application scenario according to an embodiment.

In a single-fiber bidirectional optical transmission system, two unidirectional optical amplifiers (OA) shown in FIG. 4 may be used at an optical regenerator node to amplify optical signals. An optical amplifier (OA) can also be referred to as an OA. It is feasible to add an optical amplifier.

In a single-fiber bidirectional optical transmission system that includes a regenerator optical amplifier, the Rayleigh backscattering signal can be estimated based on the optical regenerator section (which is also referred to as an optical amplifier section). A method for estimating a first regenerator section (L1 in FIG. 4) is similar to the foregoing formula (12). It is assumed that a length of each regenerator section is L, that is, L1=L2= . . . =L, and it is assumed that $\Delta l = L/N$, then for the first regenerator section, formula (14) may be changed as follows:

$$\widehat{E_{b1x1}} = \sum_{n=1}^{N} [E_{T1x}(t - n\Delta T)] \cdot e^{-(\alpha_x + j2\beta_x) \cdot n\Delta Tv/2} \cdot \Delta\rho_x(n\Delta Tv/2) \quad (17)$$

$\widehat{E_{b1x1}}$ represents estimation information of a Rayleigh backscattering signal in the x polarization state in a regenerator section of the signal sent by the Tx 1.

In simple processing, a sending signal in the x polarization state in a second regenerator section may be expressed as:

$$G \cdot E_{T1x}(t-L/v) \cdot e^{-(\alpha_x + j2\beta_x)L/2} \quad (18)$$

G is a gain coefficient of the optical amplifier. In the actual system, the optical amplifier should completely compensate for attenuation of a signal in a corresponding regenerator section, that is:

$$G \cdot e^{-\alpha_x L/2} = 1 \quad (19)$$

In this way, the sending signal in the x polarization state in the second regenerator section is simplified as:

$$E_{T1x}(t-L/v) \cdot e^{-j\beta_x L} \quad (20)$$

In this way, according to formulas (12) and (14), a Rayleigh backscattering signal in the x polarization state that is reflected by the second regenerator section to OA 2 may be:

$$\widehat{E_{b1x22}} = \sum_{n=1}^{N} E_{T1x}(t - N\Delta T/2 - n\Delta T) \cdot \quad (21)$$
$$e^{-j\beta_x N\Delta Tv/2} \cdot e^{-(\alpha_x + j2\beta_x) \cdot n\Delta Tv/2} \cdot \Delta\rho_x(N\Delta Tv/2 + n\Delta Tv/2)$$

Therefore, a Rayleigh backscattering signal in the x polarization state that is transmitted by the second optical regenerator section to the Rx 1 is:

$$\widehat{E_{b1x2}} = G \cdot \widehat{E_{b1x22}}(t - L/v) \cdot e^{-(\alpha_x + j2\beta_x)L/2} = \sum_{n=1}^{N} E_{T1x}(t - N\Delta T - n\Delta T) \cdot \quad (22)$$
$$e^{-j\beta_x N\Delta Tv} \cdot e^{-(\alpha_x + j2\beta_x) \cdot n\Delta Tv/2} \cdot \Delta\rho_x(N\Delta Tv/2 + n\Delta Tv/2)$$

Therefore, a Rayleigh backscattering signal in the x polarization state that is returned to the Rx 1 by the first regenerator section and the second regenerator section is:

$$\widehat{E_{b1x}} = \widehat{E_{b1x1}} + \widehat{E_{b1x2}} = \quad (23)$$
$$\sum_{n=1}^{2N} E_{T1x}(t - n\Delta T) \cdot e^{-\alpha_x(n\%N)\Delta Tv/2} \cdot e^{-j\beta_x n\Delta Tv} \cdot \Delta\rho_x(n\Delta Tv/2)$$

% indicates the modulo operator.

Similarly, if there are p regeneration sections, then:

$$\widehat{E_{b1x}} = \sum_{n=1}^{pN} E_{T1x}(t - n\Delta T) \cdot e^{-\alpha_x(n\%N)\Delta Tv/2} \cdot e^{-j\beta_x n\Delta Tv} \cdot \Delta\rho_x(n\Delta Tv/2) = \quad (24)$$
$$\sum_{n=1}^{pN} E_{T1x}(t - n\Delta T) \cdot C_{xn}$$

$$\widehat{E_{b1y}} = \sum_{n=1}^{pN} E_{T1y}(t - n\Delta T) \cdot e^{-\alpha_y(n\%N)\Delta Tv/2} \cdot e^{-j\beta_y n\Delta Tv} \cdot \Delta\rho_y(n\Delta Tv/2) = \quad (25)$$
$$\sum_{n=1}^{pN} E_{T1y}(t - n\Delta T) \cdot C_{yn}$$

By comparing formulas (14), (24), and (25), it can be understood that a similar method may be used. A first receiver at a first end may estimate the Rayleigh backscattering signal by using a sending signal of a first transmitter at the first end, and the estimated Rayleigh backscattering signal is removed from a signal received by the first receiver at the first end. In this way, impact of the Rayleigh backscattering signal can be weakened, to correctly restore a second sending signal sent by a second transmitter at the second end.

For $C_{xn}$ and $C_{yn}$ in the foregoing two application scenarios with an optical amplifier and without an optical amplifier, and calculation costs of formula (1), formula (2), formula (3), and formula (4) are related to the value of N, where $\Delta l$ in the foregoing embodiment is a length that is equivalent to a wavelength of the optical signal, and $\Delta T$ is far less than duration (set as $\Delta s$) for transmitting a symbol in an existing coherent optical transmission system. In this way, a quantity of the first sending signals at the multiple preset times and a quantity of first coefficients are too large, which is extremely difficult for actual implementation (or not supported by a hardware resource during the actual implementation). Therefore, reducing one or more of the quantity of the first sending signals at the multiple preset times, the first intermediate signals, second intermediate signals and the first coefficients is very important, which is related to whether the impact of the backward optical signal can be eliminated or weakened in an actual implementation. On the other hand, it should be noted that an objective of the present invention may be to weaken (or partially eliminate) the impact of the backward optical signal without accurately estimating the backward optical signal. Therefore, approximate estimation information of the backward optical signal may be obtained (for example, approximate estimation information of Rayleigh backscattering signals $\widetilde{E_{b1x}}$ and $\widetilde{E_{b1y}}$ is provided). For example, to reduce one or more of the quantity of the first sending signals at the multiple preset times, the first intermediate signals, the second intermediate signals and the first coefficients, it is necessary to reduce an amount of calculation, and enhance implementability of the solution of the embodiments. In an implementation, $\Delta T$ is set as a duration of m symbols, that is $\Delta T=m\Delta s$, and $e^{-\alpha(n\%N)\Delta Tv/2} \cdot e^{-j\beta n\Delta Tv} \cdot \Delta\rho(n\Delta Tv/2)$ in $\Delta T$ may be considered basically unchanged. In this way, the foregoing formulas (24) and (25) may be approximately changed to:

$$\widetilde{E_{b1x}} \approx \sum_{j=1}^{pN/m}\left[\sum_{i=1}^{m} E_{T1x}(t-i\Delta s-jm\Delta s+m\Delta s)\right] \cdot C_{xj} \text{ where } C_{xj} = \quad (26)$$
$$e^{-\alpha_x[(jm)\%N]m\Delta sv/2} \cdot e^{-j\beta_x jm\Delta sv} \cdot \Delta\rho_x(jmm\Delta sv/2).$$

Similarly, there is:

$$\widetilde{E_{b1y}} \approx \sum_{j=1}^{pN/m}\left[\sum_{i=1}^{m} E_{T1y}(t-i\Delta s-jm\Delta s+m\Delta s)\right] \cdot C_{yj} \text{ where } C_{yj} = \quad (27)$$
$$e^{-\alpha_y[(jm)\%N]m\Delta sv/2} \cdot e^{-j\beta_y jm\Delta sv} \cdot \Delta\rho_y(jmm\Delta sv/2).$$

In this way, a quantity of $C_{xj}$ and $C_{yj}$ is m times less than a quantity of $C_{xn}$ and $C_{yn}$. It can be understood that, in this implementation, the first coefficient is related to the strength attenuation coefficient, the propagation coefficient, and the Rayleigh backscattering coefficient when the optical signal is transmitted in the optical fiber.

To reduce the amount of calculation and enhance the implementability of the solution of the embodiments, another implementation is that, because $\alpha$ and $\beta$ are determined, therefore, within a larger time or length range, for example, $\Delta T=M\Delta s$, $M>m$, $\Delta\rho$ basically remains unchanged. In this case, the strength attenuation in the propagation direction and propagation impact may be considered for the sending signal according to formula (10), that is, formulas (24) and (25) can be approximated as follows:

$$\widetilde{E_{b1x}} = \sum_{j=1}^{pN/M}\left[\sum_{i=1}^{M} E_{T1x}(t-i\Delta s-jM\Delta s+M\Delta s) \cdot \right. \quad (28)$$
$$\left. e^{-\alpha_x[(i+jM-M)\%N]M\Delta sv/2} \cdot e^{-j\beta_x(i+jM-M)M\Delta sv}\right] \cdot C_{xj},$$

where $C_{xj}=\Delta\rho_x(jMM\Delta sv/2)$.
Similarly, there is:

$$\widetilde{E_{b1y}} = \sum_{j=1}^{pN/M}\left[\sum_{i=1}^{M} E_{T1y}(t-i\Delta s-jM\Delta s+M\Delta s) \cdot \right. \quad (29)$$
$$\left. e^{-\alpha_y[(i+jM-M)\%N]M\Delta sv/2} \cdot e^{-j\beta_y(i+jM-M)M\Delta sv}\right] C_{yj},$$

where $C_{yj}=\Delta\rho_y(jMM\Delta sv/2)$.

In this way, the quantity of $C_{xj}$ and $C_{yj}$ is M times less than the quantity of $C_{xn}$ and $C_{yn}$. Because $M>m$, compared with the foregoing manner, in this manner, one or more of the quantity of the first sending signals at the multiple preset times, the first intermediate signals, the second intermediate signals and the first coefficients is reduced more significantly, and the amount of calculation is reduced, and the implementability is better. It can be understood that in this method, second intermediate signals at the multiple preset times (for example, $$\sum_{i=1}^{M}$$
$$E_{T1x}(t-i\Delta s-jM\Delta s+M\Delta s) \cdot e^{-\alpha_x[(i+jM-M)\%N]M\Delta sv/2} \cdot e^{-j\beta_x(i+jM-M)M\Delta sv}$$

or $$\sum_{i=1}^{M}$$
$$E_{T1y}(t-i\Delta s-jM\Delta s+M\Delta s) \cdot e^{-\alpha_y[(i+jM-M)\%N]M\Delta sv/2} \cdot e^{-j\beta_y(i+jM-M)M\Delta sv})$$

are determined based on the first sending signals at the multiple preset times (for example, $E_{T1x}$ or $E_{T1y}$) and the strength attenuation coefficient and the propagation coefficient when the optical signal is transmitted in the first fiber. The second intermediate signals at the multiple preset times are separately multiplied by the corresponding first coefficient (for example, $C_{xj}$ or $C_{yj}$), to obtain the multiple first intermediate signals (for example, $$\left[\sum_{i=1}^{M}\right.$$
$$\left. E_{T1x}(t-i\Delta s-jM\Delta s+M\Delta s) \cdot e^{-\frac{\alpha_x[(i+jM-M)\%N]M\Delta sv}{2}} \cdot e^{-j\beta_x(i+jM-M)M\Delta sv} \cdot C_{xj}\right.$$

or $$\left[\sum_{i=1}^{M} E_{T1y}(t-i\Delta s-jM\Delta s+M\Delta s) \cdot \right.$$
$$\left. e^{-\frac{\alpha_y[(i+jM-M)\%N]M\Delta sv}{2}} \cdot e^{-j\beta_x(i+jM-M)M\Delta sv} \cdot C_{yj}\right).$$

In this method, the first coefficient is related to the Rayleigh backscattering coefficient when the optical signal is transmitted in the first optical fiber.

For example, $$\begin{bmatrix} \overline{E_{b1x}} \\ \overline{E_{b1y}} \end{bmatrix}$$

may be obtained by using formulas (26) and (27), or (28) and (29), $$\begin{bmatrix} \overline{E'_{b1x}} \\ \overline{E'_{b1y}} \end{bmatrix}$$

may be further obtained by using the foregoing step 203, and the impact of the backscattering is removed or weakened according to formula (9). In addition, an amount of computation can be reduced.

On the basis of any one of the foregoing embodiments, to improve calculation accuracy of a first coefficient, in the method in this embodiment, estimation information of a backward optical signal may be approximated to an actual value in the following two manners.

Manner 1: In a preset time window, the first coefficient is corrected or updated based on the estimation information of the backward optical signal, and a second transmitter stops sending a second sending signal in the preset time window.

In the preset time window, a second transmitter at a second end stops sending the second sending signal, in other words, stops sending service data. A signal received by a first receiver at a first end is a Rayleigh backscattering signal generated by a first sending signal sent by a first transmitter. A first coefficient used for calculating the estimation information of a Rayleigh backscattering signal is corrected or updated by using a received Rayleigh backscattering signal.

The first coefficient includes the foregoing $C_{xj}$, $C_{yj}$, $C_{xn}$, and $C_{yn}$. For ease of description, $C_{xj}$ and $C_{xn}$ are donoted as $C_{xi}$, and $C_{yj}$ and $C_{yn}$ are denoted as $C_{yi}$.

Figure 5:
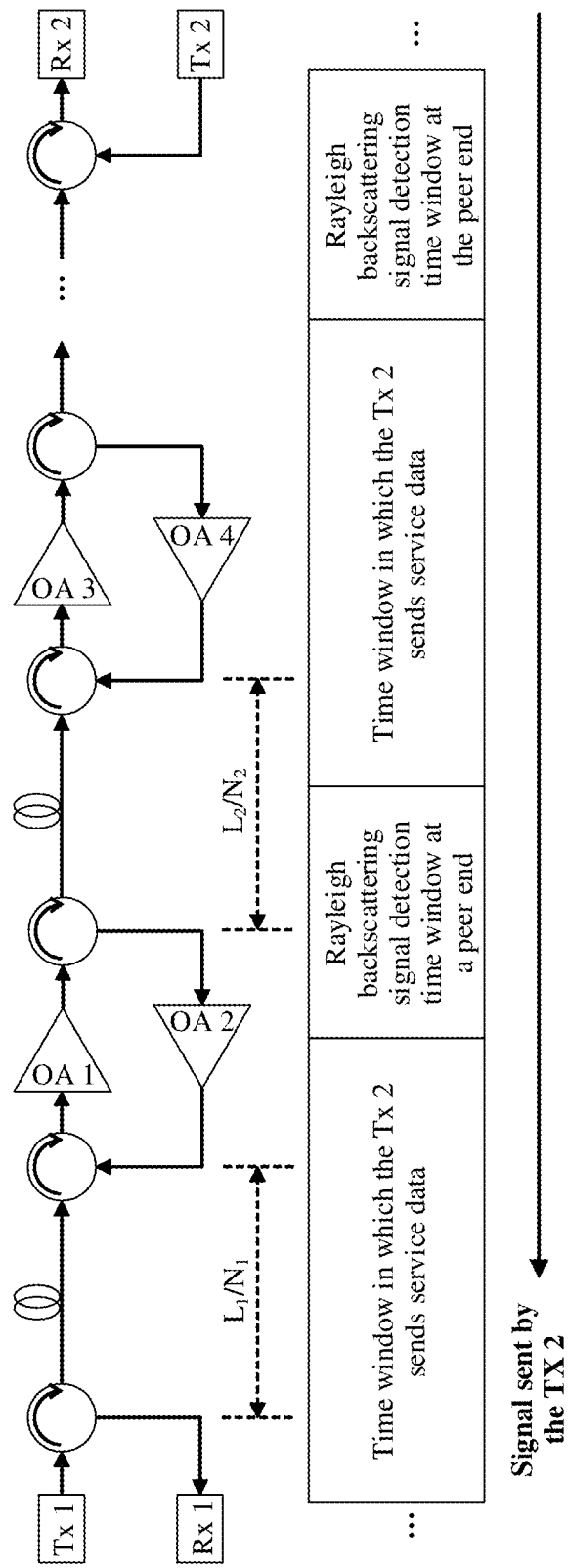
FIG. 5 is a schematic diagram of a preset time window according to an embodiment.

FIG. 5 is a schematic diagram of a preset time window according to an embodiment. As shown in FIG. 5, an interval between the preset time window and a time window for sending the service data by the Tx 2 is set. For example, in a period of time, the Tx 2 stops sending the service data, so that the first end corrects or updates the first coefficient used for calculating the estimation information of the Rayleigh backscattering signal by using the received Rayleigh backscattering signal. In a next period of time, the Tx 2 sends the service data, and in a time window in which the Tx 2 sends the service data, the first receiver Rx 1 at the first end may determine impact of the Rayleigh backscattering signal by using a first coefficient determined in the preset time period.

Alternatively, the preset time window may be referred to as a Rayleigh backscattering signal detection time window or a backscattering signal detection time window.

In the Rayleigh backscattering signal detection time window, the Rx 1 receives the Rayleigh backscattering signal of the Tx 1, that is:

$$E_{R1} = \begin{bmatrix} E_{R1x} \\ E_{R1y} \end{bmatrix} = k \cdot P_{b1} \cdot \begin{bmatrix} E_{b1x} \\ E_{b1y} \end{bmatrix} \quad (30)$$

As described above, k and Pb 1 may be considered as fixed values, and may be calculated by using a method. Therefore, an error may be defined as follows:

$$\varepsilon = \begin{bmatrix} E_{b1x} - \overline{E_{b1x}} \\ E_{b1y} - \overline{E_{b1y}} \end{bmatrix} \quad (31)$$

A mean square error is defined as:

$$\varepsilon^2 = \begin{bmatrix} \varepsilon_x^2 \\ \varepsilon_y^2 \end{bmatrix} = \begin{bmatrix} (E_{b1x} - \overline{E_{b1x}})^2 \\ (E_{b1y} - \overline{E_{b1y}})^2 \end{bmatrix} \quad (32)$$

Therefore, first coefficients in formulas (1) and (2), formulas (24) and (25), formulas (26) and (27), and formulas (28) and (29) are all denoted as $C_{xi}$ and $C_{yi}$ as described above, where x and y represent polarization states, i represents a sequence number of the first coefficient. An adjustment objective is to meet following requirements:

$$\partial \varepsilon_x^2 / \partial C_{xi} = 0 \quad (33)$$

and $$\partial \varepsilon_y^2 / \partial C_{yi} = 0 \quad (34)$$

Defining a gradient: $\nabla_{xik} = \partial \varepsilon_{xk}^2 / \partial C_{xik}$ \quad (35)

and $$\Lambda_{yik} = \partial \varepsilon_{yk}^2 / \partial C_{yik} \quad (36)$$

k represents a sampling sequence number of each first coefficient in time, and the first coefficients $C_{xi}$ and $C_{yi}$ may be obtained through gradient calculation. For example:

$$C_{xi(k+1)} = C_{xik} - \mu \Lambda_{xik} \quad (37)$$

and $$C_{yi(k+1)} = C_{yik} - \mu \Lambda_{yik} \quad (38),$$

where μ is a constant.

Figure 6:
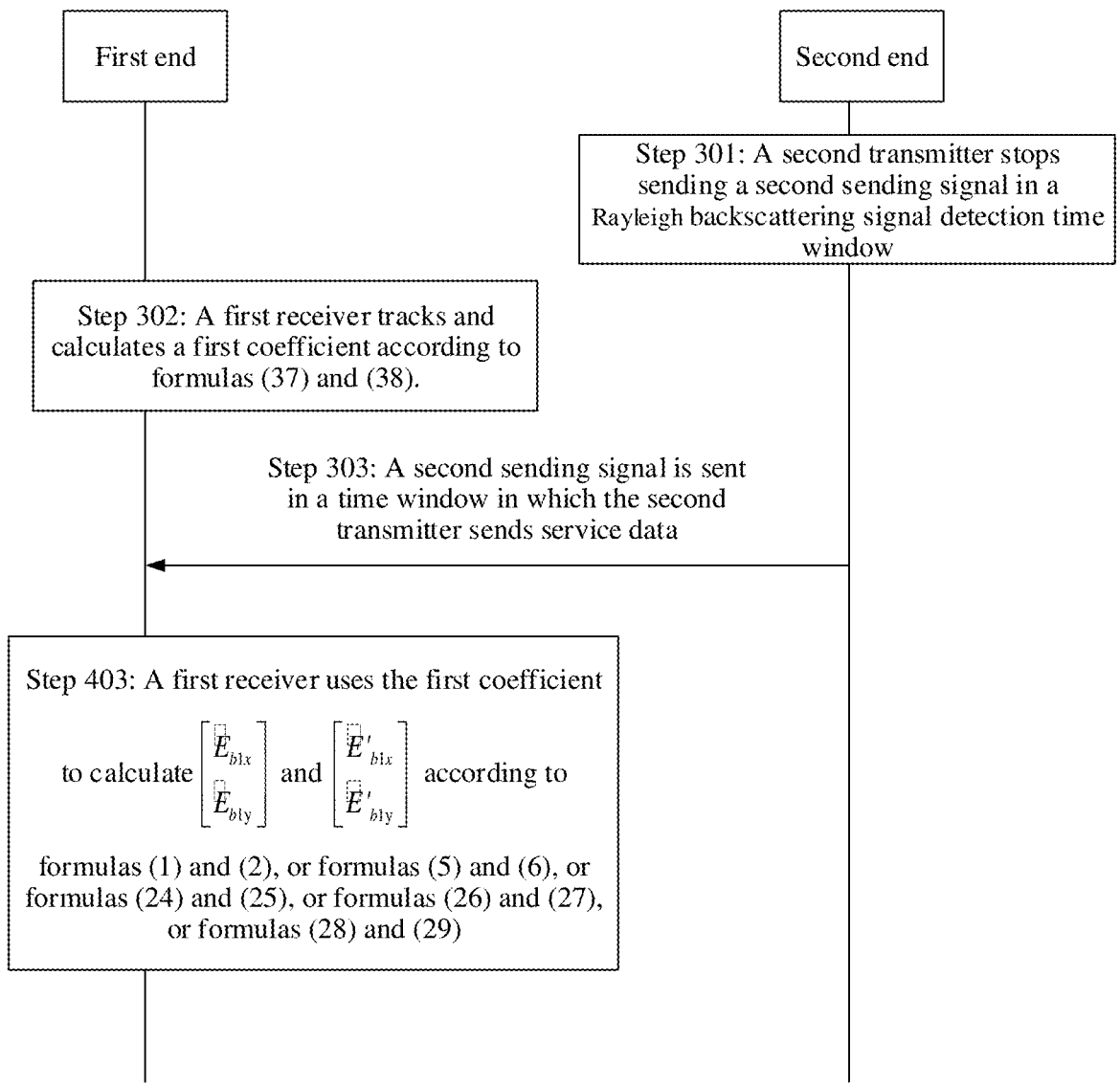
FIG. 6 is a flowchart of a method for calculating a first coefficient according to an embodiment.

FIG. 6 is a flowchart of a method for calculating a first coefficient according to an embodiment. As shown in FIG. 6, in this embodiment, on the basis of any one of the foregoing embodiments, calculation accuracy of the Rayleigh backscattering signal can be improved. The method in this embodiment may include the following steps.

Step 301: The second transmitter stops sending the second sending signal in the Rayleigh backscattering signal detection time window.

The second transmitter is located at the second end, which is a peer end of the first end.

Step 302: The first receiver tracks and calculates the first coefficient according to formulas (37) and (38).

In other words, the first coefficients $C_{xi}$ and $C_{yi}$ are calculated according to the foregoing formulas (37) and (38).

Step 303: The second transmitter sends the second sending signal in the time window in which the second transmitter sends the service data.

Step 304: The first receiver uses the first coefficient to calculate $$\begin{bmatrix} \vec{E}_{h1x} \\ \vec{E}_{b1y} \end{bmatrix}$$

and $$\begin{bmatrix} \vec{E''}_{h1x} \\ \vec{E''}_{b1x} \end{bmatrix}$$

according to formulas (1) and (2), or formulas (5) and (6), or formulas (24) and (25), or formulas (26) and (27), or formulas (28) and (29).

In this embodiment, by setting the Rayleigh backscattering signal detection time window, the second transmitter stops sending the second sending signal in the Rayleigh backscattering signal detection time window, so that the first receiver can correct or update the first coefficient used for calculating the estimation information of the Rayleigh backscattering signal by using the signal sent by the first transmitter. This improves calculation accuracy of the Rayleigh backscattering signal.

Manner 2: The first coefficient is corrected or updated based on a bit error rate, before bit error correction is performed, used when a second sending signal is obtained.

For example, a first receiver may perform continuous correction based on a pre-correction bit error rate of the second sending signal sent by a second transmitter and received by the first receiver, to calculate the first coefficient.

$$\text{Assuming that: } \varepsilon^2 = BER_{SR2x} + BER_{SR2y} \quad (39)$$

$BER_{SR2x}$ indicates that the Rx 1 detects a pre-correction bit error rate of service data sent in an x polarization state of a Tx 2. $BER_{SR2y}$ indicates that the Rx 1 detects a pre-correction bit error rate of service data sent in a y polarization state of the Tx 2.

$$\text{Defining a gradient: } \Lambda_{xik} = \partial \varepsilon^2 / \partial C_{xik} \quad (40)$$

and $$\Lambda_{yik} = \partial \varepsilon^2 / \partial C_{yik} \quad (41)$$

Figure 7:
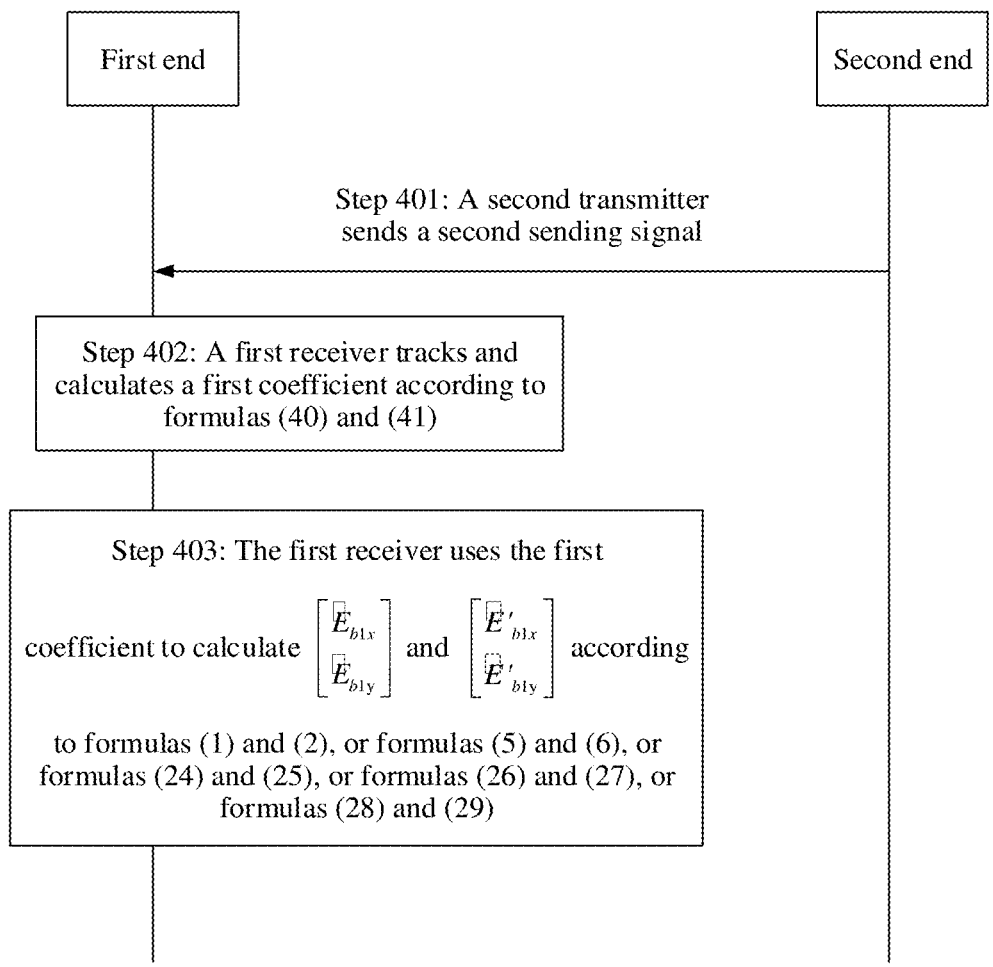
FIG. 7 is a flowchart of another method for calculating a first coefficient according to an embodiment.

FIG. 7 is a flowchart of another method for calculating a first coefficient according to an embodiment. As shown in FIG. 7, in this embodiment, on the basis of any one of the foregoing embodiments, the calculation accuracy of the Rayleigh backscattering signal can be improved. The method in this embodiment may include the following steps.

Step 401: The second transmitter sends the second sending signal.

Step 402: The first receiver tracks and calculates the first coefficient according to formulas (40) and (41).

In other words, the first coefficients $C_{xi}$ and $C_{yi}$ are calculated according to the foregoing formulas (40) and (41).

Step 403: The first receiver uses the first coefficient to calculate $$\begin{bmatrix} \vec{E}_{h1x} \\ \vec{E}_{b1y} \end{bmatrix}$$

and $$\begin{bmatrix} \vec{E''}_{h1x} \\ \vec{E''}_{b1y} \end{bmatrix}$$

according to formulas (1) and (2), or formulas (5) and (6), or formulas (24) and (25), or formulas (26) and (27), or formulas (28) and (29).

In this embodiment, the first coefficient used for calculating the estimation information of the Rayleigh backscattering signal by using the pre-correction bit error rate is corrected or updated, to improve the calculation accuracy of the Rayleigh backscattering signal.

Figure 8:
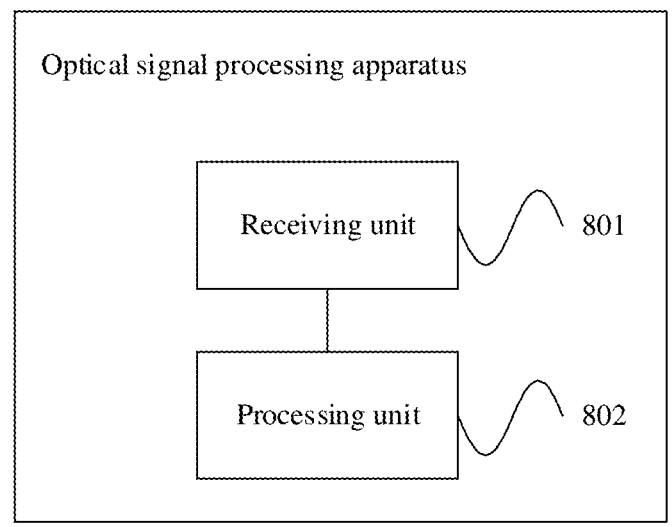
FIG. 8 is a schematic diagram of a structure of an optical signal processing apparatus according to an embodiment.

FIG. 8 is a schematic diagram of a structure of an optical signal processing apparatus according to an embodiment. The optical signal processing apparatus may be used as a first receiver. As shown in FIG. 8, the apparatus in this embodiment may include a processing unit 802. Optionally, the apparatus in this embodiment may further include a receiving unit 801, and the receiving unit 801 is configured to receive a second sending signal and a backward optical signal. The processing unit 802 is configured to obtain a first sending signal, where the first sending signal is a signal that is sent by a first transmitter to a second receiver through a first optical fiber; determine estimation information of the backward optical signal based on the first sending signal, where the backward optical signal is generated during transmission of the first sending signal, the backward optical signal is transmitted through at least one fiber section in the first optical fiber, and a transmission direction of the backward optical signal in the at least one fiber section is opposite to a transmission direction of the first sending signal; and the processing unit 802 is further configured to obtain a second sending signal based on the estimation information of the backward optical signal, where the second sending signal is a signal sent by a second transmitter to the first receiver through a second optical fiber, and at least one section of the first optical fiber and one section of the second optical fiber partially overlap, and in the overlapping part of optical fibers, the transmission direction of the first sending signal is opposite to a transmission direction of the second sending signal.

It should be noted that a processing unit of the first receiver or a processing unit at a first end may be an electrical processing unit, or may be an optical processing unit. When the estimation information of the backward optical signal is an electrical signal (which may be a digital electrical signal or an analog electrical signal), the processing unit of the first receiver or the processing unit at the first end may be the electrical processing unit. Theoretically, because processing such as equalization of the optical signal can also be implemented at an optical layer, the first receiver may also determine the estimation information of the backward optical signal at the optical layer based on the first sending signal. In this case, the estimation information of the backward optical signal may also be an optical signal (in this case, the first sending signal is generally also the optical signal). In this case, the processing unit of the first receiver or the processing unit of the first end may be the optical processing unit.

In some embodiments, the processing unit 802 is configured to obtain a coherent received signal, where the coherent received signal is obtained by the first receiver in a coherent reception manner; and obtain the second sending signal based on the coherent received signal and the estimation information of the backward optical signal.

In some embodiments, the backward optical signal is a Rayleigh backscattering signal.

In some embodiments, the first sending signal includes first sending signals at multiple preset times before a current moment. The processing unit 802 is configured to separately multiply the first sending signals at the multiple preset times by a corresponding first coefficient, to obtain multiple first intermediate signals; and determine the estimation information of the backward optical signal based on the multiple first intermediate signals. The first sending signal at each preset time corresponds to one first coefficient. The first coefficient is related to any one or more of a strength attenuation coefficient, a propagation coefficient, a group velocity, and a Rayleigh backscattering coefficient when the optical signal is transmitted in the optical fiber.

In some embodiments, the processing unit 802 is further configured to determine second intermediate signals at the multiple preset times based on the first sending signals at the multiple preset times and the strength attenuation coefficients and propagation coefficient when the optical signal is transmitted in the optical fiber; and separately multiply second intermediate signals at the multiple preset times by the corresponding first coefficient, to obtain the multiple first intermediate signals.

In some embodiments, an effective length of the first optical fiber is L, the multiple preset times are N preset times, an interval between adjacent preset times is $\Delta T$, $\Delta T \cdot v = 2 L/N$, and v is the group velocity. The effective length of the first optical fiber is not greater than a length of the first optical fiber. The processing unit 802 is configured to separately multiply the first sending signals at the N preset times by the corresponding first coefficient, to obtain N first intermediate signals. N is a positive integer.

In some embodiments, at least one optical amplifier is disposed in the first optical fiber, the at least one optical amplifier divides the first optical fiber into at least two optical amplifier regenerator sections. The multiple preset times include multiple preset times corresponding to each optical amplifier regenerator section. The processing unit 802 is configured to separately multiply the first sending signals at the multiple preset times corresponding to each optical amplifier regenerator section by the corresponding first coefficient, to obtain multiple first intermediate signals.

In some embodiments, the processing unit 802 is further configured to correct or update the first coefficient based on a bit error rate, before bit error correction is performed, used when the second sending signal is obtained.

In some embodiments, the processing unit 802 is further configured to correct or update the first coefficient based on the estimation information of the backward optical signal in a preset time window, and stop sending the second sending signal by the second transmitter in the preset time window.

The foregoing optical signal processing apparatus in this embodiment may be configured to execute the solutions executed by the first receiver/the processing unit of the first receiver in the foregoing method embodiments. Implementation principles and effects thereof are similar. For a function of each unit, refer to corresponding descriptions in the method embodiments. Details are not described herein again.

Figure 9:
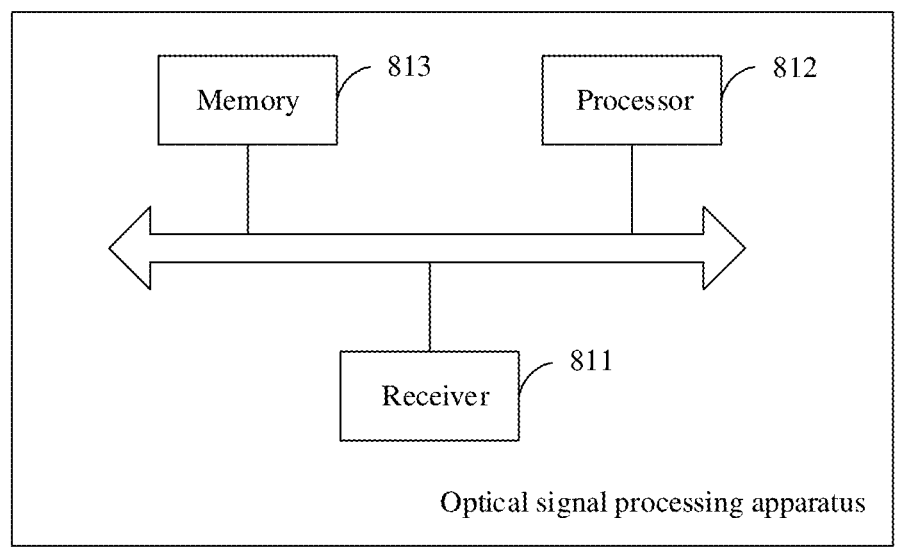
FIG. 9 is a schematic diagram of a structure of an optical signal processing apparatus according to another embodiment.

FIG. 9 is a schematic diagram of a structure of an optical signal processing apparatus according to another embodiment. As shown in FIG. 9, the optical signal processing apparatus in this embodiment serves as a first receiver and includes a receiver 811 and a processor 812.

During hardware implementation, the foregoing receiving unit 801 may be the receiver 811 in this embodiment. The foregoing processing unit 802 may be the processor 812 in this embodiment.

The processor 812 may include at least one of a central processing unit (CPU), a digital signal processor (DSP), a microcontroller unit (MCU), an application-specific integrated circuit (ASIC), a field-programmable gate array ( ), an electrical digital circuit, an electrical analog circuit, an optical module formed by optical components, an integrated optical chip, a chip integrated with optical and electrical components, or the like.

Optionally, the first device in this embodiment may further include a memory 813. The memory 813 is configured to store a program instruction, and the processor 812 is configured to invoke the program instruction in the memory 813 to execute the foregoing solutions.

The program instruction may be implemented in a form of a software function unit and can be sold or used as an independent product. The memory 813 may be a computer-readable storage medium in any form. Based on such understanding, all or some of the solutions in the embodiments may be represented in a form of a software product, and the software product includes several instructions for indicating a computer device, which may be the processor 812, to perform all or some of the steps of the first receiver in the embodiments. The foregoing computer-readable storage medium includes: any medium that can store program code, such as a USB flash drive, a removable hard disk, a read-only memory (ROM), a random access memory (RAM), a magnetic disk, or an optical disc.

The foregoing first receiver in this embodiment may be configured to execute the solutions executed by the first receiver/the processing unit of the first receiver in the foregoing method embodiments. Implementation principles and effects thereof are similar. For a function of each component, refer to corresponding descriptions in the method embodiments. Details are not described herein again.

Figure 10:
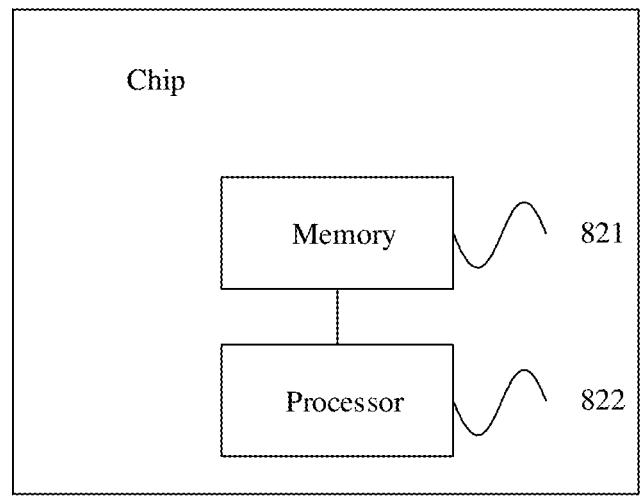
FIG. 10 is a schematic diagram of a structure of a chip according to an embodiment.

FIG. 10 is a schematic diagram of a structure of a chip according to an embodiment. As shown in FIG. 10, the chip in this embodiment may serve as a chip of a first receiver, and the chip in this embodiment may include a memory 821 and a processor 822. The memory 821 is in a communication connection to the processor 822.

The memory 821 is configured to store a program instruction, and the processor 822 is configured to invoke the program instruction in the memory 821 to execute the foregoing solutions.

The foregoing chip in this embodiment may be configured to execute the solutions of the first receiver in the foregoing method embodiments. Implementation principles and effects thereof are similar. For a function of each unit, refer to corresponding descriptions in the method embodiments. Details are not described herein again.

Figure 11:
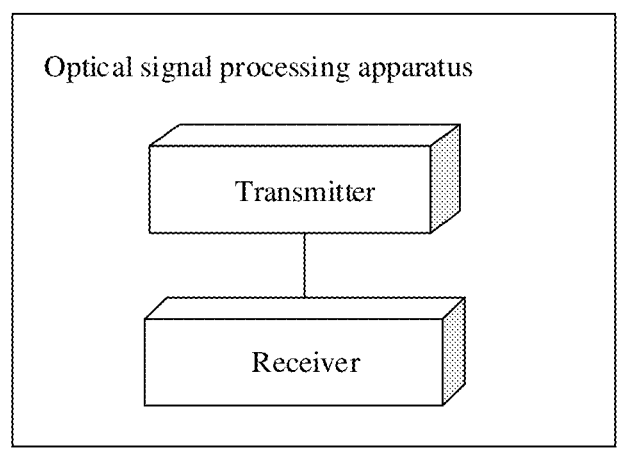
FIG. 11 is a schematic diagram of a structure of an optical signal processing apparatus according to another embodiment.

FIG. 11 is a schematic diagram of a structure of an optical signal processing apparatus according to another embodiment. As shown in FIG. 11, the optical signal processing apparatus may include a transmitter and a receiver. The transmitter serves as a first transmitter, and the receiver serves as a first receiver and may be configured to execute the solutions of the first receiver in the foregoing method embodiments. Implementation principles and effects thereof are similar. For a function of each unit, refer to corresponding descriptions in the method embodiments. Details are not described herein again.

It should be noted that, in this embodiment, unit division is an example, and is merely a logical function division. In actual implementation, another division manner may be used. Functional units in the embodiments may be integrated into one processing unit, or each of the units may exist alone physically, or two or more units are integrated into one unit. An integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such understanding, the solutions essentially, or a part contributing to the prior art, or all or some of the solutions may be implemented in the form of a software product. The software product is stored in a storage medium and includes several instructions for indicating a computer device (which may be a personal computer, a server, a network device, or the like) or a processor to perform all or some of the steps of the methods described in the embodiments. The foregoing storage medium includes: any medium that can store program code, such as a USB flash drive, a removable hard disk, a ROM, a RAM, a magnetic disk, or an optical disc.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, procedures or functions according to the embodiments are completely or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center that includes one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

What is claimed is:

1. An optical signal processing method, comprising:
   obtaining a first sending signal, wherein the first sending signal is a signal that is sent by a first transmitter to a second receiver through a first optical fiber and the first sending signal includes first sending signals at multiple preset times before a current moment;
   determining estimation information of a backward optical signal based on the first sending signal, wherein the backward optical signal is generated during transmission of the first sending signal, the backward optical signal is transmitted through at least one fiber section in the first optical fiber, and a transmission direction of the backward optical signal in the at least one fiber section is opposite to a transmission direction of the first sending signal; and
   obtaining a second sending signal based on the estimation information of the backward optical signal, wherein the second sending signal is a signal sent by a second transmitter to a first receiver through a second optical fiber, at least a part of the first optical fiber and a part of the second optical fiber overlap, and, in the overlapping part of optical fibers, the transmission direction of the first sending signal is opposite to a transmission direction of the second sending signal.

2. The method according to claim 1, wherein obtaining the second sending signal based on the estimation information of the backward optical signal further comprises:
   obtaining a coherent received signal, wherein the coherent received signal is obtained by the first receiver in a coherent receiving manner; and
   obtaining the second sending signal based on the coherent received signal and the estimation information of the backward optical signal.

3. The method according to claim 1, wherein the backward optical signal is a Rayleigh backscattering signal.

4. The method according to claim 1, wherein determining estimation information of the backward optical signal based on the first sending signal further comprises:
   separately multiplying the first sending signals at the multiple preset times by a corresponding first coefficient, to obtain multiple first intermediate signals;
   determining the estimation information of the backward optical signal based on the multiple first intermediate signals; and
   the first sending signal at each preset time corresponds to one first coefficient; and the first coefficient is related to any one or more of a strength attenuation coefficient, a propagation coefficient, a group velocity, and a Rayleigh backscattering coefficient when the optical signal is transmitted in the optical fiber.

5. The method according to claim 4, further comprising:
   determining second intermediate signals at the multiple preset times based on the first sending signals at the multiple preset times and the strength attenuation coefficient and the propagation coefficient when the optical signal is transmitted in the optical fiber; and separately multiplying the first sending signals at the multiple preset times by the corresponding first coefficient, to obtain the multiple first intermediate signals further comprises:
   separately multiplying the second intermediate signals at the multiple preset times by the corresponding first coefficient to obtain the multiple first intermediate signals.

6. The method according to claim 4, wherein an effective length of the first optical fiber is L, the multiple preset times are N preset times, an interval between adjacent preset times is $\Delta T$, $\Delta T \cdot v = 2$ L/N, where v is the group velocity, the effective length of the first optical fiber is not greater than a length of the first optical fiber, and separately multiplying the first sending signals at the multiple preset times by the corresponding first coefficient to obtain the multiple first intermediate signals further comprises:
   separately multiplying the first sending signals at the N preset times by the corresponding first coefficient to obtain N first intermediate signals, wherein N is a positive integer.

7. The method according to claim 4, wherein at least one optical amplifier is disposed in the first optical fiber, the at least one optical amplifier divides the first optical fiber into at least two optical amplifier regenerator sections, the multiple preset times comprise multiple preset times corresponding to each optical amplifier regenerator section, and separately multiplying the first sending signals at the multiple preset times by the corresponding first coefficient to obtain the multiple first intermediate signals further comprises:
separately multiplying first sending signals at the multiple preset times corresponding to each optical amplifier regenerator section by the corresponding first coefficient to obtain the multiple first intermediate signals.

8. The method according to claim 7, further comprising:
correcting or updating the first coefficient based on a bit error rate, before bit error correction is performed, used when the second sending signal is obtained.

9. The method according to claim 7, further comprising:
correcting or updating, in a preset time window, the first coefficient based on the estimation information of the backward optical signal; and
stopping, by the second transmitter in the preset time window, the sending of the second sending signal.

10. An optical signal processing apparatus, wherein the optical signal processing apparatus serves as a first receiver, and the apparatus comprises:
one or more processors, and
a storage medium configured to store program instructions;
wherein, when executed by the one or more processors, the instructions cause the device to:
obtain a first sending signal, wherein the first sending signal is a signal that is sent by a first transmitter to a second receiver through a first optical fiber and the first sending signal includes first sending signals at multiple preset times before a current moment;
determine estimation information of a backward optical signal based on the first sending signal, wherein the backward optical signal is generated during transmission of the first sending signal, the backward optical signal is transmitted through at least one fiber section in the first optical fiber, and a transmission direction of the backward optical signal in the at least one fiber section is opposite to a transmission direction of the first sending signal; and
obtain a second sending signal based on the estimation information of the backward optical signal, wherein the second sending signal is a signal sent by a second transmitter to a first receiver through a second optical fiber, at least a part of the first optical fiber and a part of the second optical fiber overlap, and, in the overlapping part of optical fibers, the transmission direction of the first sending signal is opposite to a transmission direction of the second sending signal.

11. The apparatus according to claim 10, wherein, when executed by the one or more processors, the instructions further cause the apparatus to:
obtain a coherent received signal, wherein the coherent received signal is obtained by the first receiver in a coherent receiving manner; and
obtain the second sending signal based on the coherent received signal and the estimation information of the backward optical signal.

12. The apparatus according to claim 10, wherein the backward optical signal is a Rayleigh backscattering signal.

13. The apparatus according to claim 10, wherein, when executed by the one or more processors, the instructions further cause the apparatus to:

separately multiply the first sending signals at the multiple preset times by a corresponding first coefficient, to obtain multiple first intermediate signals;
determine the estimation information of the backward optical signal based on the multiple first intermediate signals, wherein the first sending signal at each preset time corresponds to one first coefficient, and the first coefficient is related to any one or more of a strength attenuation coefficient, a propagation coefficient, a group velocity, and a Rayleigh backscattering coefficient when the optical signal is transmitted in the optical fiber.

14. The apparatus according to claim 13, wherein, when executed by the one or more processors, the instructions further cause the apparatus to:
determine second intermediate signals at the multiple preset times based on the first sending signals at the multiple preset times and the strength attenuation coefficient and the propagation coefficient when the optical signal is transmitted in the optical fiber; and
separately multiply the second intermediate signals at the multiple preset times by the corresponding first coefficient, to obtain the multiple first intermediate signals.

15. The apparatus according to claim 14, wherein an effective length of the first optical fiber is L, the multiple preset times are N preset times, an interval between adjacent preset times is $\Delta T$, $\Delta T \cdot v = 2\ L/N$, where v is the group velocity, the effective length of the first optical fiber is not greater than a length of the first optical fiber, the processing unit is configured to
separately multiply the first sending signals at the N preset times by the corresponding first coefficient, to obtain N first intermediate signals, and N is a positive integer.

16. The apparatus according to claim 14, wherein at least one optical amplifier is disposed in the first optical fiber, the at least one optical amplifier divides the first optical fiber into at least two optical amplifier regenerator sections, the multiple preset times comprise multiple preset times corresponding to each optical amplifier regenerator section, and, when executed by the one or more processors, the instructions further cause the apparatus to:
separately multiply first sending signals at the multiple preset times corresponding to each optical amplifier regenerator section by the corresponding first coefficient, to obtain the multiple first intermediate signals.

17. The apparatus according to claim 13, wherein, when executed by the one or more processors, the instructions further cause the apparatus to:
correct or update the first coefficient based on a bit error rate, before bit error correction is performed, used when the second sending signal is obtained.

18. The apparatus according to claim 13, wherein, when executed by the one or more processors, the instructions further cause the apparatus to:
correct or update, in a preset time window, the first coefficient based on the estimation information of the backward optical signal, and
stop, in the preset time window, sending the second sending signal.

19. A non-transitory computer-readable storage medium having a program recorded thereon; wherein the program makes the computer execute a method comprising:
obtaining a first sending signal, wherein the first sending signal is a signal that is sent by a first transmitter to a second receiver through a first optical fiber and the first sending signal includes first sending signals at multiple preset times before a current moment;

determining estimation information of a backward optical signal based on the first sending signal, wherein the backward optical signal is generated during transmission of the first sending signal, the backward optical signal is transmitted through at least one fiber section in the first optical fiber, and a transmission direction of the backward optical signal in the at least one fiber section is opposite to a transmission direction of the first sending signal; and obtaining a second sending signal based on the estimation information of the backward optical signal, wherein the second sending signal is a signal sent by a second transmitter to a first receiver through a second optical fiber, and at least a part of the first optical fiber and a part of the second optical fiber overlap; and, in the overlapping part of optical fibers, the transmission direction of the first sending signal is opposite to a transmission direction of the second sending signal.

* * * * *